US011635225B2

(12) United States Patent
Kanematsu et al.

(10) Patent No.: US 11,635,225 B2
(45) Date of Patent: Apr. 25, 2023

(54) AIR CONDITIONING SYSTEM

(71) Applicant: Panasonic Intellectual Property Management Co., Ltd., Osaka (JP)

(72) Inventors: Daisuke Kanematsu, Aichi (JP); Naoyuki Funada, Aichi (JP); Ayumi Konishi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 340 days.

(21) Appl. No.: 17/265,847

(22) PCT Filed: Sep. 18, 2019

(86) PCT No.: PCT/JP2019/036617
§ 371 (c)(1),
(2) Date: Feb. 4, 2021

(87) PCT Pub. No.: WO2020/066801
PCT Pub. Date: Apr. 2, 2020

(65) Prior Publication Data
US 2021/0310685 A1    Oct. 7, 2021

(30) Foreign Application Priority Data

Sep. 27, 2018  (JP) .............................. JP2018-181121
Mar. 26, 2019  (JP) .............................. JP2019-057585
Aug. 8, 2019   (JP) .............................. JP2019-145884

(51) Int. Cl.
*F24F 11/67*     (2018.01)
*F24F 11/76*     (2018.01)
(Continued)

(52) U.S. Cl.
CPC ............ *F24F 11/67* (2018.01); *F24F 3/0442* (2013.01); *F24F 3/14* (2013.01); *F24F 11/54* (2018.01);
(Continued)

(58) Field of Classification Search
CPC .. F24F 3/0442; F24F 3/14; F24F 11/54; F24F 11/67; F24F 11/76; F24F 2011/0002;
(Continued)

(56) References Cited

U.S. PATENT DOCUMENTS 8,019,478 B2 *  9/2011  Whitehurst .............. F24F 11/30
                                                              62/127
8,219,252 B2 *  7/2012  Nanami .................... F24F 11/64
                                                              700/277
(Continued)

FOREIGN PATENT DOCUMENTS

CA    2445970 C  *  4/2010   .............. F24F 12/00
CA    2836688 A1 *  6/2014   .............. F25B 49/02
(Continued)

OTHER PUBLICATIONS

International Search Report for corresponding Application No. PCT/JP2019/036617, dated Nov. 26, 2019.

*Primary Examiner* — Crystal J Barnes-Bullock
(74) *Attorney, Agent, or Firm* — Renner, Otto, Boisselle & Sklar, LLP

(57) ABSTRACT

A plurality of independent air conditioners, a first air conditioner (AC) (9a), a second AC (9b), and a third AC (9c), are disposed in an air conditioning room. Individual target temperatures of each habitable room that are acquired from an input/output terminal (19) and an outdoor temperature that is acquired by an outdoor temperature sensor (7) are input to a mode setter (32). Based on the individual target temperatures and the outdoor temperature, the mode setter (32) sets a cooling mode and a cooling setpoint temperature for operation in the cooling mode, or a heating mode and a heating setpoint temperature for operation in the heating mode, for each of the first AC (9a), the second AC (9b), and the third AC (9c).

19 Claims, 10 Drawing Sheets

(51) Int. Cl.
*F24F 11/54* (2018.01)
*F24F 3/044* (2006.01)
*F24F 3/14* (2006.01)
*F24F 110/20* (2018.01)
*F24F 110/12* (2018.01)
*F24F 110/10* (2018.01)
*F24F 11/00* (2018.01)
*G05B 15/02* (2006.01)

(52) U.S. Cl.
CPC ....... *F24F 11/76* (2018.01); *F24F 2011/0002* (2013.01); *F24F 2011/0006* (2013.01); *F24F 2110/10* (2018.01); *F24F 2110/12* (2018.01); *F24F 2110/20* (2018.01); *G05B 15/02* (2013.01)

(58) Field of Classification Search
CPC .......... F24F 2011/0006; F24F 2011/211; F24F 2011/10; F24F 2110/12; F24F 2110/20; G05B 15/02
See application file for complete search history.

(56) References Cited

U.S. PATENT DOCUMENTS

| | | | | |
|---|---|---|---|---|
| 9,822,989 | B2* | 11/2017 | Federspiel | F24F 11/86 |
| 10,088,211 | B2* | 10/2018 | Unezaki | F25B 13/00 |
| 11,098,919 | B2* | 8/2021 | Nabeshima | F24F 11/70 |
| 11,353,233 | B2* | 6/2022 | Funada | F24F 3/001 |
| 11,402,117 | B2* | 8/2022 | Sasaki | F24F 11/63 |
| 11,421,923 | B2* | 8/2022 | Knight | F25B 25/005 |
| 2013/0268126 | A1* | 10/2013 | Iwami | F24F 11/52 |
| | | | | 700/276 |

FOREIGN PATENT DOCUMENTS

| | | | | |
|---|---|---|---|---|
| DE | 112011100374 T5 | * | 11/2012 | ............ G06Q 10/00 |
| DE | 112014007068 T5 | * | 6/2017 | ............. F24F 11/30 |
| DE | 112016004498 T5 | * | 7/2018 | ............ F24F 1/0003 |
| JP | 2011-127845 A | | 6/2011 | |
| JP | 2011-174674 A | | 9/2011 | |
| JP | 2014-190666 A | | 10/2014 | |
| JP | 2016-090084 A | | 5/2016 | |

* cited by examiner

AIR CONDITIONING SYSTEM

TECHNICAL FIELD

The present disclosure relates to an air conditioning system.

BACKGROUND ART

A conventional whole-house type air conditioning system is known, in which at least one air conditioning room is provided in a super-insulated house including a plurality of habitable rooms. Air conditioning inside the air conditioning room is controlled by a single air conditioner, and the air conditioning room is connected to each of the habitable rooms by a supply air duct, so that the air inside the air conditioning room is individually distributed to the habitable rooms (for example, see Patent Literature 1).

In this type of conventional air conditioning system, the temperature of the air conditioning room is set according to a target temperature for each of the habitable rooms, and according to this, the air conditioner is automatically operated so as to switch between a cooling mode and a heating mode. Thereby, the inside of the air conditioning room is air conditioned so that the target temperature can be reached for each of the habitable rooms. This conventional air conditioning system does not require a dedicated air conditioner, and is able to achieve whole-house air conditioning that does not specify the manufacturer of the air conditioner.

CITATION LIST

Patent Literature

PTL 1: Japanese Patent Unexamined Publication No. 2011-127845

SUMMARY

However, when such a conventional air conditioning system is used in a season or an area in which diurnal temperature variation is great, the operating mode of the automatically-operated air conditioner may be frequently switched between the cooling mode and the heating mode, so the lifetime of the air conditioner may be shortened. Another problem is that, because the switching operation between the cooling mode and the heating mode with an automatic operation of the air conditioner depends on the manufacturer of the air conditioner or the air conditioner itself, the operation of the air conditioner is unpredictable especially in an intermediate season, which is neither the cooling season nor the heating season and in which the target temperature of each habitable room and the outdoor temperature are approximately equal. Thus, to perform stable control, there remains room for improvement in the above-described whole-house type air conditioning system.

The disclosure has been accomplished in view of such problems, and it is an object of the disclosure to provide an air conditioning system that is able to perform stable control.

It is another object of the disclosure to provide an air conditioning system that is able to perform efficient dehumidifying.

In order to accomplish the foregoing and other objects, an air conditioning system according of an embodiment of the disclosure includes a plurality of air conditioners, a plurality of conveying fans, a habitable room temperature sensor, an outdoor temperature sensor, an air conditioning room temperature sensor, a target temperature input receiver, and a system controller. The plurality of air conditioners are disposed in the air conditioning room and are each independently controllable. The plurality of conveying fans transfer air of the air conditioning room to a plurality of habitable rooms, which are different from the air conditioning room, and the plurality of conveying fans are disposed respectively corresponding to the plurality of habitable rooms. The habitable room temperature sensor acquires temperatures of the plurality of habitable rooms. The outdoor temperature sensor acquires an outdoor temperature. The air conditioning room temperature sensor acquires a temperature of the air conditioning room. The target temperature input receiver receives input of individual target temperatures, each of which is a target temperature of each of the plurality of habitable rooms. The system controller controls the air conditioners and the conveying fans, and includes an airflow volume determiner, a mode setter, and a fan airflow volume controller. The airflow volume determiner determines an airflow volume of each of the conveying fans, based on the individual target temperatures acquired from the target temperature input receiver, the temperatures of each of the plurality of habitable rooms acquired by the habitable room temperature sensor, and the temperature of the air conditioning room acquired by the air conditioning room temperature sensor. The mode setter sets, for each of the plurality of independent air conditioners, a cooling mode and a cooling setpoint temperature for operation in the cooling mode or a heating mode and a heating setpoint temperature for operation in the heating mode, based on the individual target temperatures acquired from the target temperature input receiver and the outdoor temperature acquired by the outdoor temperature sensor. The fan airflow volume controller causes the air of the air conditioning room that is air-conditioned based on settings set by the mode setter to be transferred to the habitable rooms independently at the airflow volumes of the conveying fans that are determined by the airflow volume determiner.

In another embodiment, the air conditioning system of the disclosure includes a plurality of air conditioner disposed in an air conditioning room and each being independently controllable, and conveying fans that transfer air of the air conditioning room to a plurality of habitable rooms that are different from the air conditioning room. The air conditioning system also includes an air conditioning room temperature sensor acquiring a temperature of the air conditioning room, an air conditioning room humidity sensor acquiring a humidity of the air conditioning room, a target humidity input receiver receiving input of target humidities of habitable rooms, and a system controller controlling the air conditioners. The air conditioning system further includes a mode setter such that, when the humidity of the air conditioning room acquired by the air conditioning room humidity sensor is higher than the target humidity acquired from the target humidity input receiver, the mode setter sets a cooling mode and a cooling setpoint temperature for operation in the cooling mode for at least one of the plurality of independent air conditioners, the cooling setpoint temperature being a temperature such that the air of the air conditioning room can be dehumidified based on the temperature of the air conditioning room acquired by the air conditioning room temperature sensor and the humidity of the air conditioning room acquired by the air conditioning room humidity sensor, and sets a heating mode and a heating setpoint temperature for operation in the heating mode for at least another one of the air conditioners that is other than the at least one of the air conditioners that is set to the cooling mode.

The air conditioning system according to the present disclosure allows the mode setter to set, for each of the plurality of independent air conditioners, a cooling mode and a cooling setpoint temperature for operation in the cooling mode or a heating mode and a heating setpoint temperature for operation in the heating mode, based on the individual target temperatures of each of the plurality of habitable rooms acquired from the target temperature input receiver and the outdoor temperature acquired by the outdoor temperature sensor. Then, the air of the air conditioning room that is air-conditioned based on the settings set by the mode setter is transferred to the habitable rooms independently at the airflow volumes of the conveying fans that are determined by the airflow volume determiner, by means of the fan airflow volume controller. This makes it possible to set the cooling mode and the cooling setpoint temperature, or the heating mode and the heating setpoint temperature, independently for the plurality of air conditioners. As a result, air conditioning of the air conditioning room can be controlled stably without use of automatic operation of the air conditioners. Therefore, an advantageous effect is obtained that it is possible to provide an air conditioning system that achieves stable control.

Another advantageous effect is that it is possible to dehumidify the air conditioning room without necessitating a dehumidifier.

DESCRIPTION OF EMBODIMENTS

Figure 1:
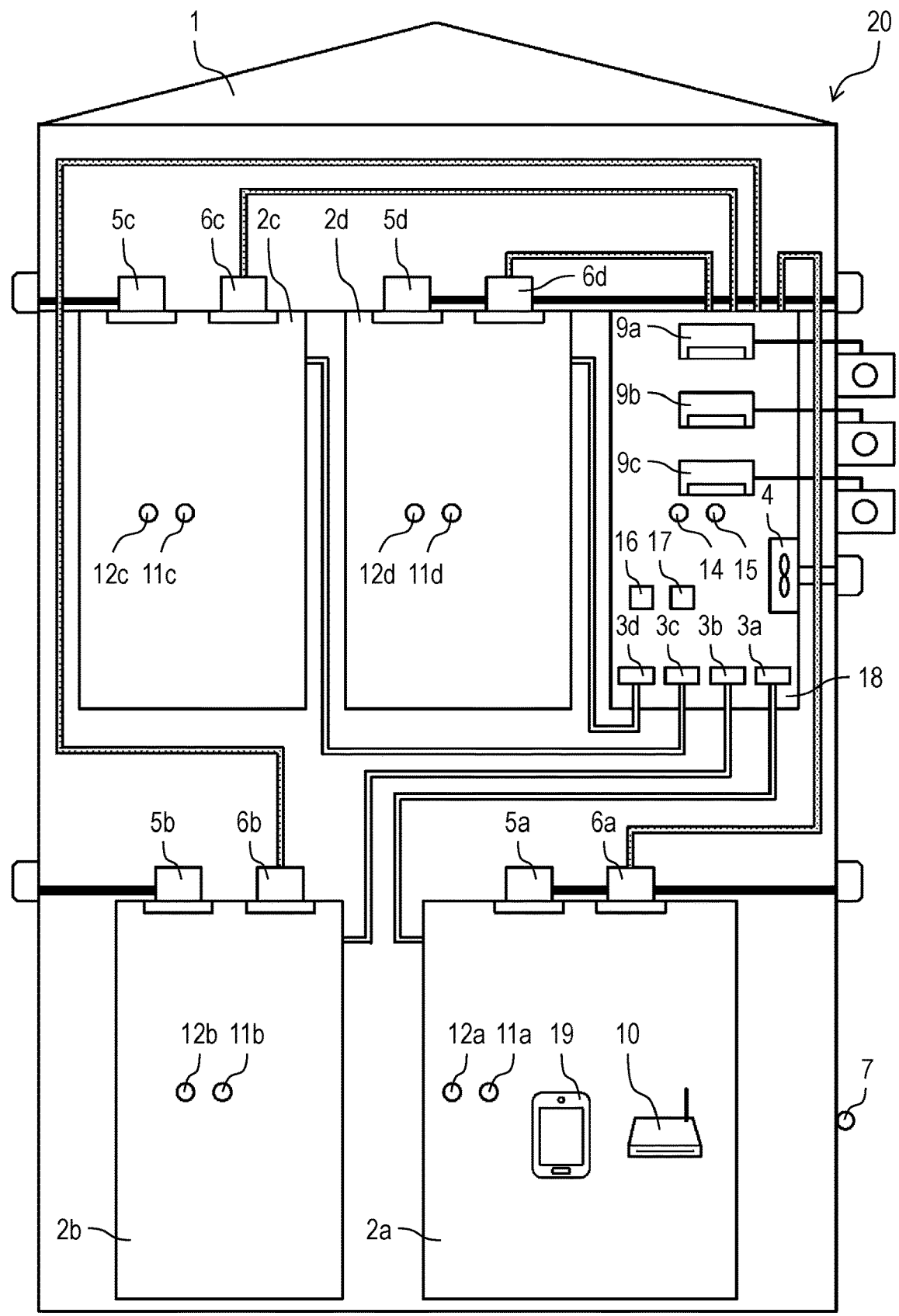
FIG. 1 is a schematic connection diagram illustrating a ventilating and air conditioning system according to a first exemplary embodiment of the disclosure.

Hereafter, embodiments of the present disclosure will be described with reference to the appended drawings. Note that each of the exemplary embodiments described hereinbelow illustrates a specific example of the present disclosure. Accordingly, the numerical values, shapes, materials, structural elements, arrangements and connections of the structural elements, steps (processes), order of the steps, etc. shown in the following exemplary embodiments are merely examples, and therefore do not limit the scope of the present disclosure. Therefore, among the constituent elements in the following exemplary embodiments, those not recited in any one of the independent claims which indicate the broadest inventive concepts of the present disclosure are described as optional elements. In the drawings, substantially the same parts are designated by the same reference numerals, and the repetitive description thereof may be omitted or simplified.

First Exemplary Embodiment

First, ventilating and air conditioning system 20 according to a first exemplary embodiment, which is one embodiment of the air conditioning system of the present disclosure, will be described with reference to FIG. 1. FIG. 1 is a schematic connection diagram illustrating ventilating and air conditioning system 20 according to the first exemplary embodiment.

Ventilating and air conditioning system 20 is configured to include outdoor air intake fan 4, a plurality of exhaust fans 5a, 5b, 5c, and 5d, a plurality of conveying fans 3a, 3b, 3c, and 3d, a plurality of circulation fans 6a, 6b, 6c, and 6d, outdoor temperature sensor 7, habitable room temperature sensors 11a, 11b, 11c, and 11d, habitable room humidity sensors 12a, 12b, 12c, and 12d, air conditioning room temperature sensor 14, air conditioning room humidity sensor 15, a plurality of air conditioners 9a, 9b, and 9c, humidifier 16, dehumidifier 17, input/output terminal 19, and system controller 10.

Ventilating and air conditioning system 20 is installed in general residential house 1, which is an example of building. General residential house 1 includes a plurality (four in the present exemplary embodiment) of habitable rooms 2a to 2d and at least one air conditioning room 18, which is independent from habitable rooms 2a to 2d. Herein, general residential house 1 (residential house) is housing that is provided as an estate for residents to live their personal lives, and generally, the habitable rooms include living rooms, dining rooms, bedrooms, private rooms, children's rooms, and so forth. It is also possible that the habitable rooms for which ventilating and air conditioning system 20 is provided may include toilets, bathrooms, washrooms, changing rooms, and the like.

In air conditioning room 18, outdoor air is taken into air conditioning room 18 by outdoor air intake fan 4 and is mixed with the air that is transferred by circulation fans 6a to 6d from each of habitable rooms 2a to 2d. The temperature and humidity of the air in air conditioning room 18 are controlled by a plurality (three in the present exemplary embodiment) of air conditioners 9a to 9c, humidifier 16, and dehumidifier 17, which are disposed in air conditioning room 18, so that the air of air conditioning room 18 is air-conditioned. The air that is air-conditioned in air conditioning room 18 is transferred to each of habitable rooms 2a to 2d by conveying fans 3a to 3d. Thus, ventilating and air conditioning system 20 performs whole-house air conditioning for general residential house 1.

The air of habitable rooms 2a to 2d is transferred to air conditioning room 18 by circulation fans 6a to 6d and is additionally exhausted as outdoor air by exhaust fans 5a to 5d from the inside of habitable rooms 2a to 2d to outside of general residential house 1. Ventilating and air conditioning system 20 controls the exhaust airflow volume of exhaust fans 5a to 5d to exhaust the outdoor air from the inside of the rooms, and simultaneously controls the supply airflow volume of outdoor air intake fan 4 in association with the exhaust airflow volume of exhaust fans 5a to 5d to introduce the outdoor air into the inside of the rooms, to thereby perform mechanical heat recovery ventilation.

Outdoor air intake fan 4 is a fan that introduces outdoor air into the inside of general residential house 1. A supply air fan, a supply air function of a heat exchange ventilation fan, and the like may be applicable to outdoor air intake fan 4. As described above, the outdoor air that is taken in by outdoor air intake fan 4 is introduced into air conditioning room 18. The supply airflow volume of outdoor air intake fan 4 is configured to be set to multiple levels, and the exhaust airflow volume thereof is set according to the exhaust airflow volume of exhaust fans 5a to 5d.

Exhaust fans 5a to 5d are fans that discharge part of the air in corresponding habitable rooms 2a to 2d as outdoor air. A ceiling-recessed fan, a wall-mounted fan, a kitchen ventilation fan, an exhaust function of a heat exchange ventilation fan, and the like may be applicable to exhaust fans 5a to 5d. Exhaust fan 5a is disposed in habitable room 2a, exhaust fan 5b is disposed in habitable room 2b, exhaust fan 5c is disposed in habitable room 2c, and exhaust fan 5d is disposed in habitable room 2d.

Each of exhaust fans 5a to 5d is configured so that the exhaust airflow volume thereof can be set to multiple levels. In a normal operation, each of exhaust fans 5a to 5d is controlled so as to be at a predetermined exhaust airflow volume. The exhaust airflow volumes are controlled for each of exhaust fans 5a to 5d according to settings indicated by the user and values acquired by various sensors.

Conveying fans 3a to 3d are disposed in air conditioning room 18 corresponding to respective habitable rooms 2a to 2d. The air in air conditioning room 18 is transferred by conveying fan 3a to habitable room 2a, transferred by conveying fan 3b to habitable room 2b, transferred by conveying 3c to habitable room 2c, and transferred by conveying fan 3d to habitable room 2d.

Circulating fan 6a is disposed in habitable room 2a, circulating fan 6b is disposed in habitable room 2b, circulating fan 6c is disposed in habitable room 2c, and circulating fan 6d is disposed in habitable room 2d. Part of the air in each of habitable rooms 2a to 2d is transferred by corresponding circulating fans 6a to 6d to air conditioning room 18.

Air conditioners 9a to 9c correspond to the air conditioners. A plurality of air conditioners, first air conditioner (hereinafter referred to as "first AC") 9a, second air conditioner (hereinafter referred to as "second AC") 9b, and third air conditioner (hereinafter referred to as "third AC") 9c, control the air conditioning of air conditioning room 18. Air conditioners 9a to 9c may be general-purpose products. Herein, "general-purpose product" is not a product that is developed or adjusted as a dedicated product exclusively for the air conditioning system according to the present application, but is an air conditioner that is sold separately from the air conditioning system and is able to perform air conditioning of habitable rooms on its own.

First AC 9a, second AC 9b, and third AC 9c are controllable independently from each other, and a cooling mode or a heating mode is set as their operating mode individually. For each of first AC 9a, second AC 9b, and third AC 9c, a cooling setpoint temperature for operation in the cooling mode is set when each of them is set to the cooling mode, and a heating setpoint temperature for operation in the heating mode is set when each of them is set to the heating mode.

The air conditioner whose operating mode is set to the cooling mode cools the air of air conditioning room 18 so that air conditioning room 18 becomes the cooling setpoint temperature. The air conditioner whose operating mode is set to the heating mode heats the air of air conditioning room 18 so that air conditioning room 18 becomes the heating setpoint temperature.

In the present disclosure, the number of air conditioners to be provided in one air conditioning room 18 is not limited to 3, as long as a plurality of air conditioners are provided therein.

Humidifier 16 humidifies the air of air conditioning room 18 so that the humidity of the air of air conditioning room 18 becomes a predetermined target humidity (air conditioning room target humidity) when the humidity is lower than the air conditioning room target humidity.

Dehumidifier 17 dehumidifies the air of air conditioning room 18 so that the humidity of the air of air conditioning room 18 becomes the predetermined target humidity (air conditioning room target humidity) when the humidity is higher than the air conditioning room target humidity.

Outdoor temperature sensor 7 is disposed outside of general residential house 1. Outdoor temperature sensor 7 acquires an outdoor temperature to transmit the temperature to system controller 10.

Habitable room temperature sensor 11a is disposed in habitable room 2a, habitable room temperature sensor 11b is disposed in habitable room 2b, habitable room temperature sensor 11c is disposed in habitable room 2c, and habitable room temperature sensor 11d is disposed in habitable room 2d. Habitable room temperature sensors 11a to 11d acquire the indoor temperatures of corresponding habitable rooms 2a to 2d, respectively, and transmit the temperatures to system controller 10.

Habitable room humidity sensor 12a is disposed in habitable room 2a, habitable room humidity sensor 12b is disposed in habitable room 2b, habitable room humidity sensor 12c is disposed in habitable room 2c, and habitable room humidity sensor 12d is disposed in habitable room 2d. Habitable room humidity sensors 12a to 12d acquire the indoor humidities of corresponding habitable rooms 2a to 2d, respectively, and transmit the humidities to system controller 10.

Air conditioning room temperature sensor 14 is a sensor that acquires the temperature of the air of the air conditioning room 18 and transmits it to system controller 10. Air conditioning room humidity sensor 15 is a sensor that acquires the humidity of the air of the air conditioning room 18 and transmits it to system controller 10.

System controller 10 is a controller that controls the entirety of ventilating and air conditioning system 20. System controller 10 is communicatively connected by wireless communication to outdoor air intake fan 4, exhaust fans 5a to 5d, conveying fans 3a to 3d, circulating fans 6a to 6d, outdoor temperature sensor 7, habitable room temperature sensors 11a to 11d, habitable room humidity sensors 12a to 12d, air conditioning room temperature sensor 14, air conditioning room humidity sensor 15, first AC 9a, second AC 9b, third AC 9c, humidifier 16, and dehumidifier 17.

System controller 10 controls outdoor air intake fan 4 and exhaust fans 5a to 5d in association with each other. For example, system controller 10 may set the supply airflow volume of outdoor air intake fan 4 to be an airflow volume that corresponds to the exhaust airflow volume of exhaust fans 5a to 5d. This makes it possible to perform mechanical heat recovery ventilation for general residential house 1.

In addition, based on the individual target temperatures, which are the respective target temperatures of habitable rooms 2a to 2d, and the outdoor temperature acquired by outdoor temperature sensor 7, system controller 10 sets a cooling mode or a heating mode as the operating mode and also a cooling setpoint temperature or a heating setpoint temperature, for each of first AC 9a, second AC 9b, and third AC 9c independently. As a result, the operation of each of first AC 9a, second AC 9b, and third AC 9c controls the temperature of the air in air conditioning room 18 so as to be a temperature that corresponds to the cooling setpoint temperature and/or the heating setpoint temperature.

Moreover, system controller 10 controls humidifier 16 and dehumidifier 17 based on the humidity of the air in air conditioning room 18 acquired by air conditioning room humidity sensor 15 so that the humidity of air in air conditioning room 18 becomes the air conditioning room target humidity that is set for air in air conditioning room 18.

Furthermore, system controller 10 sets airflow volumes for conveying fans 3a to 3d and airflow volumes for circulating fans 6a to 6d based on the indoor temperatures and/or the indoor humidities of the respective habitable rooms 2a to 2d that are acquired by habitable room temperature 11a to 11d and habitable room humidity sensor 12a to 12d, the target temperatures (individual target temperatures) and/or the target humidities (individual target humidities) that are set for each of habitable rooms 2a to 2d, the temperature and/or the humidity of the air in air conditioning room 18 that are acquired by air conditioning room temperature sensor 14 and air conditioning room humidity sensor 15, and the like.

As a result, the air that is air-conditioned in air conditioning room 18 is transferred to each of habitable rooms 2a to 2d at the airflow volume that is set for each of conveying fans 3a to 3d, and the air in each of habitable rooms 2a to 2d is transferred to air conditioning room 18 at the airflow volume that is set for each of circulating fans 6a to 6d. Thus, the indoor temperature and/or the indoor humidity of each of habitable rooms 2a to 2d is/are controlled so as to be the individual target temperature and/or the individual target temperature.

Herein, complicated wiring work is made unnecessary because system controller 10 is connected by wireless communication to outdoor air intake fan 4, exhaust fans 5a to 5d, conveying fans 3a to 3d, circulating fans 6a to 6d, outdoor temperature sensor 7, habitable room temperature sensors 11a to 11d, habitable room humidity sensors 12a to 12d, air conditioning room temperature sensor 14, air conditioning room humidity sensor 15, first AC 9a, second AC 9b, third AC 9c, humidifier 16, and dehumidifier 17. However, it is also possible that all of these components, or system controller 10 and some of them, may be communicatively connected by wired communication.

Input and output terminal 19 is communicatively connected to system controller 10 by wireless communication, to accept input of necessary information for configuring ventilating and air conditioning system 20 in order to allow system controller 10 to store the information, and also to acquire and display the status of ventilating and air conditioning system 20 from system controller 10.

The individual target temperatures, each of which is a target temperature for each of habitable rooms 2a to 2d, are input from this input and output terminal 19. This input and output terminal 19 corresponds to the target temperature input receiver and the target humidity input receiver. Examples of input and output terminal 19 include mobile information terminal devices, such as a mobile telephone, a smartphone, and a tablet computer.

Input and output terminal 19 may not necessarily be connected to system controller 10 by wireless communication, but may be communicatively connected to system controller 10 by wired communication. In that case, input and output terminal 19 may be implemented by, for example, a wall-mounted remote controller.

Input and output terminal 19 may be configured to include a plurality of independent terminals. The terminals may be configured so that different information can be input or output from different terminals. For example, habitable rooms 2a to 2d each may be provided with respective wall-mounted remote controllers so that the respective remote controllers can set the target temperatures (individual target temperatures) of the corresponding habitable rooms.

Figure 2:
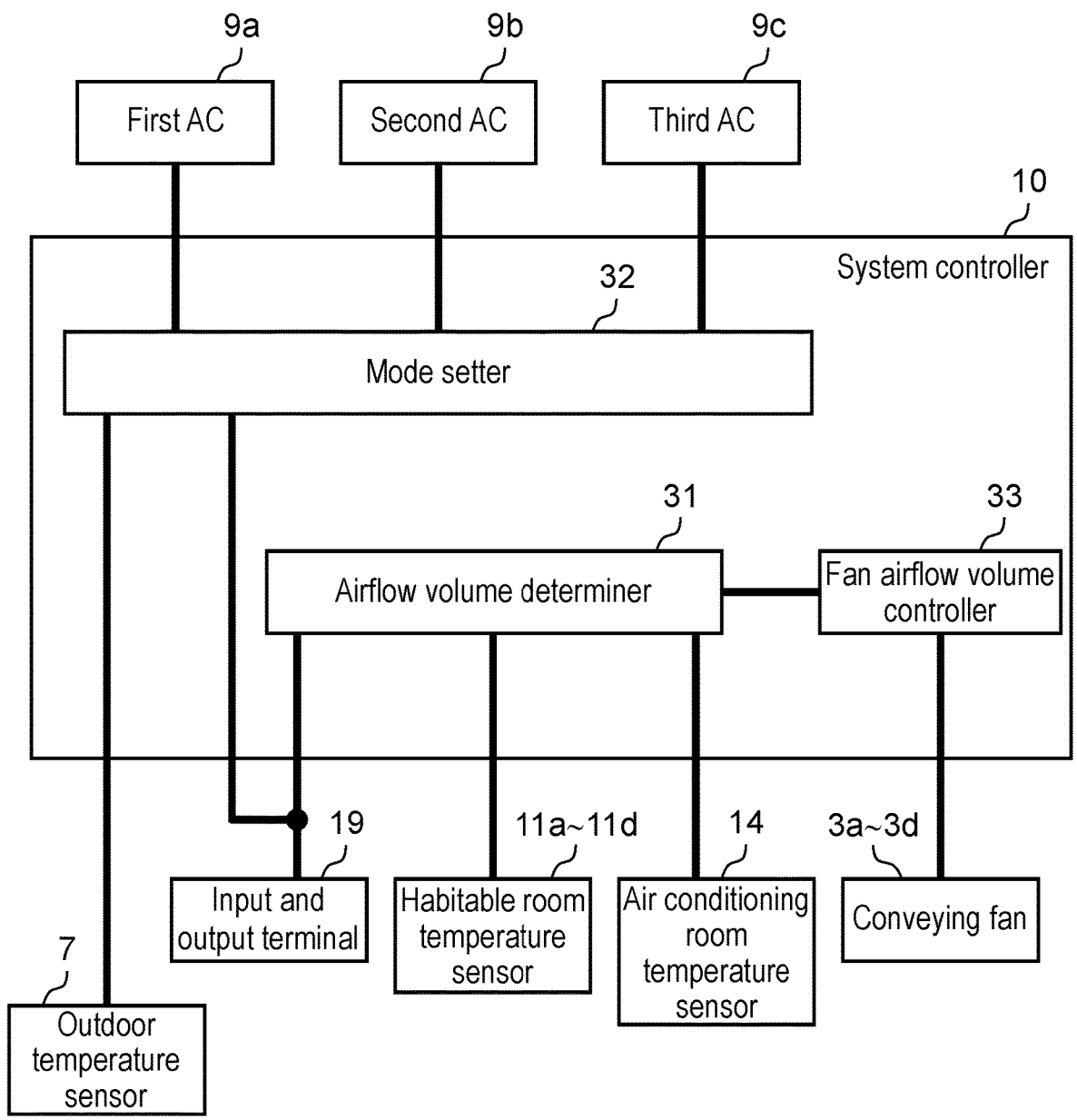
FIG. 2 is a schematic functional block diagram of a system controller of the ventilating and air conditioning system.

Next, various functions of system controller 10 are described with reference to FIG. 2. FIG. 2 is a schematic functional block diagram of system controller 10.

System controller 10 at least includes airflow volume determiner 31, mode setter 32, and fan airflow volume controller 33.

Airflow volume determiner 31 determines an airflow volume of each of conveying fans 3a to 3d disposed in air conditioning room 18. The individual target temperatures of the respective habitable rooms 2a to 2d, which are acquired from input and output terminal 19, are input to airflow volume determiner 31. The temperatures of the plurality of habitable rooms 2a to 2d, which are acquired by habitable room temperature sensors 11a to 11d, are also input to airflow volume determiner 31. Also, the temperature of air conditioning room 18, which is acquired by air conditioning room temperature sensor 14, is input to airflow volume determiner 31.

Airflow volume determiner 31 individually determines the airflow volume of each of conveying fans 3a to 3d, which respectively correspond to habitable rooms 2a to 2d, based on the temperatures of the corresponding habitable rooms and the temperature of air conditioning room 18 at that time, so that the temperatures of habitable rooms 2a to 2d become the individual target temperatures determined respectively. The details of airflow volume determiner 31 will be described later with reference to FIG. 5.

Mode setter 32 sets a cooling mode and a cooling setpoint temperature for operation in the cooling mode, or a heating mode and a heating setpoint temperature for operation in the heating mode, for each of the plurality of independent air conditioners, first AC 9a, second AC 9b, and third AC 9c, which are disposed in air conditioning room 18. The individual target temperatures for the plurality of habitable rooms 2a to 2d, which are acquired from input and output terminal 19, and the outdoor temperature, which is acquired by outdoor temperature sensor 7, are input to mode setter 32.

Based on the individual target temperatures and the outdoor temperature that have been input thereto, mode setter 32 sets an operating mode and a setpoint temperature for each of first AC 9a, second AC 9b, and third AC 9c. The details of mode setter 32 will be described later with reference to FIGS. 3 and 4.

Fan airflow volume controller 33 controls air blowing performed by conveying fans 3a to 3d. Specifically, fan airflow volume controller 33 controls conveying fans 3a to 3d so as to cause the air in air conditioning room 18 to be independently transferred to habitable rooms 2a to 2d at the respective airflow volumes of conveying fans 3a to 3d that are determined by airflow volume determiner 31. This allows the air in air conditioning room 18 that is air-conditioned by first AC 9a, second AC 9b, and third AC 9c based on the settings set by mode setter 32 to be transferred to habitable rooms 2a to 2d at the airflow volumes that are determined correspondingly to respective habitable rooms 2a to 2d. As a result, ventilating and air conditioning system 20 is controlled so that the indoor temperatures of habitable rooms 2a to 2d become the individual target temperatures that are set respectively.

Figure 3:
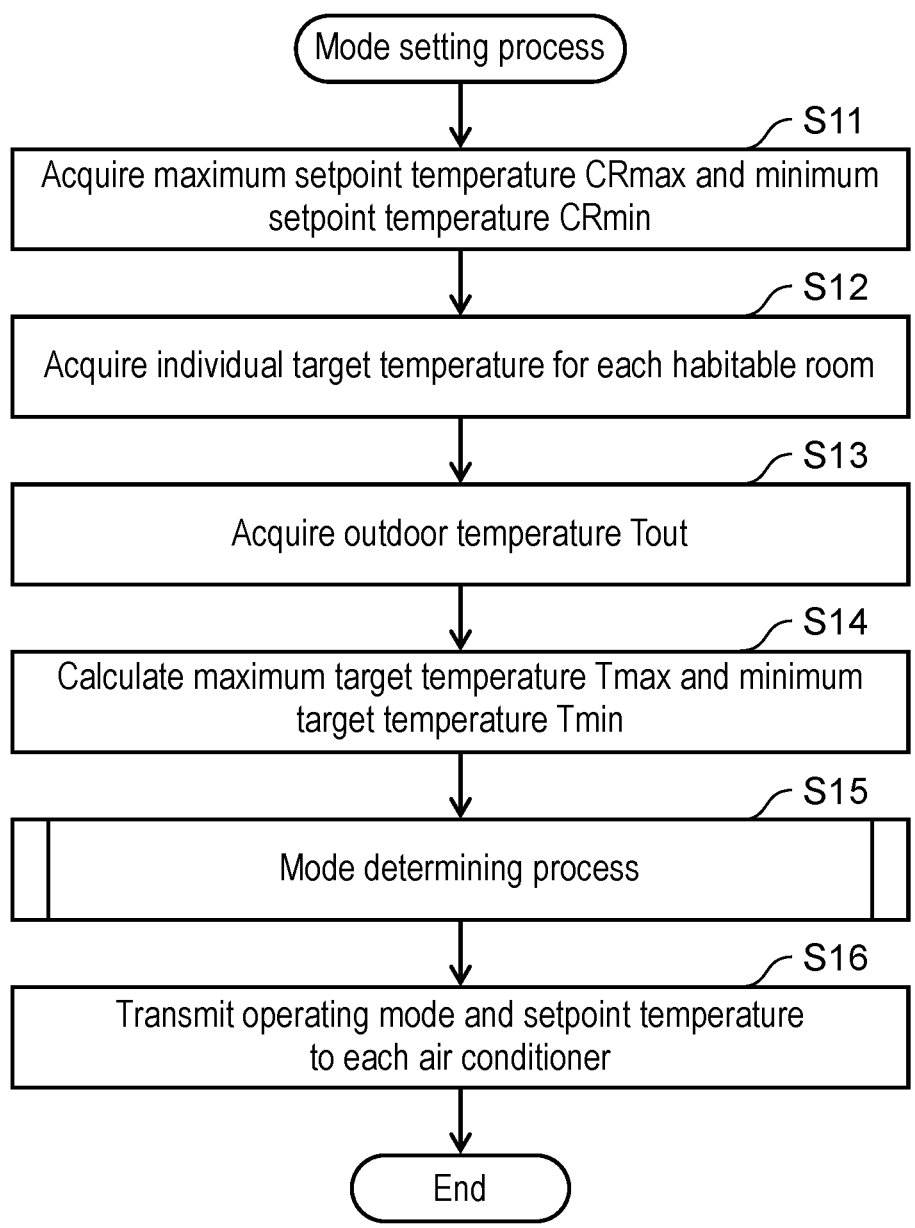
FIG. 3 is a flowchart illustrating a mode setting process executed by the system controller.
Figure 4:
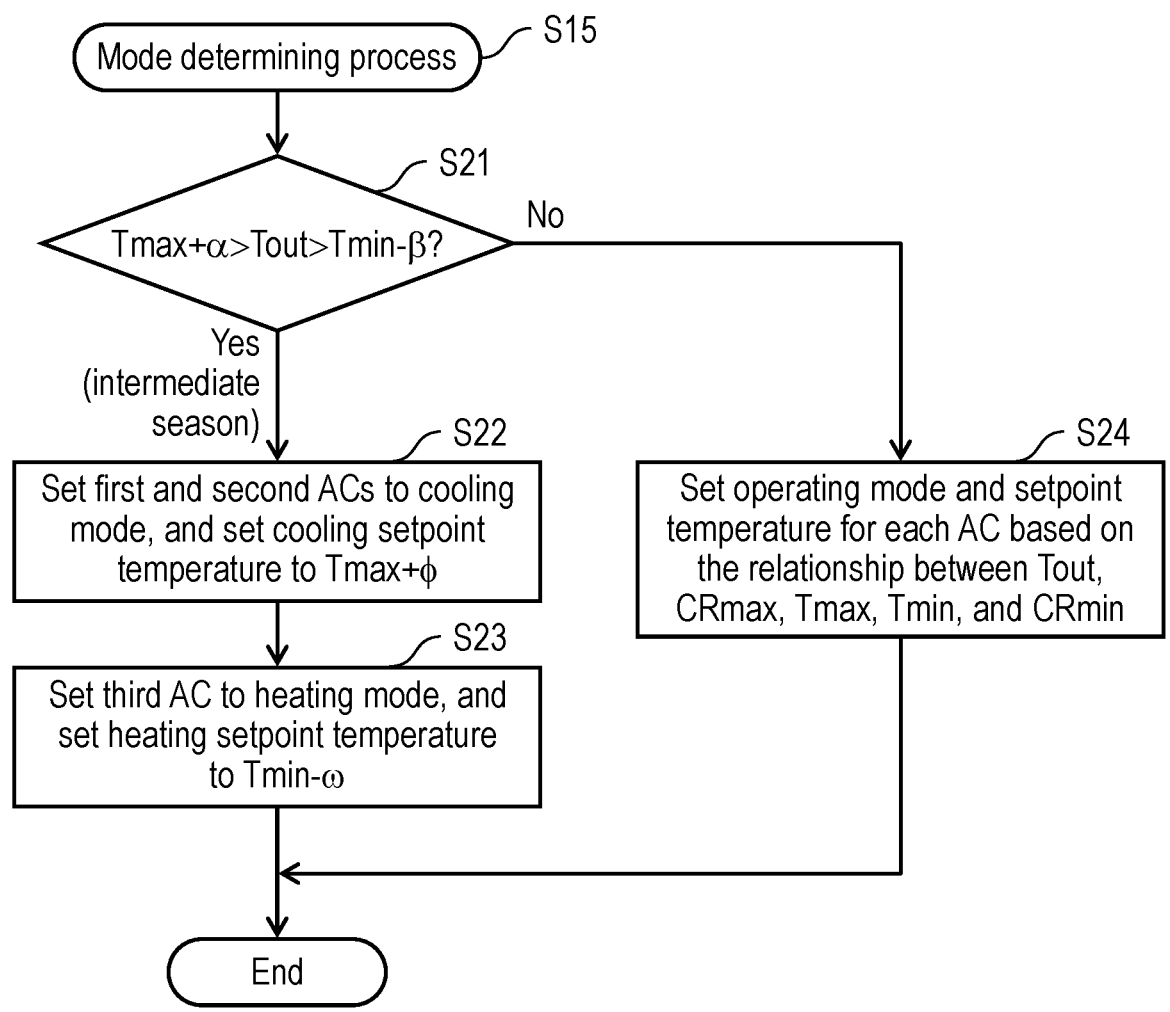
FIG. 4 is a flowchart illustrating a mode determining process executed by the system controller.

Next, a mode setting process executed by system controller 10 will be described with reference to FIGS. 3 and 4. First, FIG. 3 is a flowchart illustrating the mode setting process.

This mode setting process is executed by system controller 10 at every predetermined time (for example, every 1 hour). In addition, the mode setting process may be executed also when the individual target temperature for any of habitable rooms 2a to 2d is changed by the user through input and output terminal 19.

System controller 10 constitutes mode setter 32 (see FIG. 2) by executing the mode setting process.

When executing the mode setting process, system controller 10 first acquires maximum setpoint temperature CRmax and minimum setpoint temperature CRmin, which are the maximum value and the minimum value of the range of the individual target temperature that can be set for habitable rooms 2a to 2d (S11). These maximum setpoint temperature CRmax and minimum setpoint temperature CRmin may be stored in a memory storage unit previously provided in system controller 10, or may be stored in a memory storage unit of input and output terminal 19.

Next, system controller 10 acquires the individual target temperatures that are respectively set for habitable rooms 2a to 2d from input and output terminal 19, which constitutes the target temperature input receiver (S12). Subsequently, system controller 10 acquires current outdoor temperature Tout, which is acquired by outdoor temperature sensor 7 (S13).

Next, system controller 10 calculates maximum target temperature Tmax, which is the maximum value of the respective individual target temperatures of habitable rooms 2a to 2d, which have been acquired by the process of S12, and minimum target temperature Tmin, which is the minimum value of the individual target temperatures (S14).

Then, system controller 10 executes a mode determining process (S15). This mode determining process sets an operating mode and a setpoint temperature for each of first AC 9a, second AC 9b, and third AC 9c in air conditioning room 18, based on the relationship between maximum setpoint temperature CRmax and minimum setpoint temperature CRmin acquired by the process of S11, outdoor temperature Tout acquired by the process of S13, and maximum target temperature Tmax and minimum target temperature Tmin calculated by the process of S14. The details of the mode determining process will be described later with reference to FIG. 4.

After executing the mode determining process of S15, system controller 10 transmits, to first AC 9a, second AC 9b, and third AC 9c, the operating mode and the setpoint temperature that have been set for each of first AC 9a, second AC 9b, and third AC 9c (S16), and ends the mode determining process. This enables first AC 9a, second AC 9b, and third AC 9c to perform air conditioning of air conditioning room 18 in the operating modes and at the setpoint temperatures that have been determined according to maximum setpoint temperature CRmax and minimum setpoint temperature CRmin, current outdoor temperature Tout, and maximum target temperature Tmax and minimum target temperature Tmin of the individual target temperatures that have been set for each of habitable rooms 2a to 2d.

Here, the details of the mode determining process (S15) that is executed by system controller 10 in the mode setting process will be described with reference to FIG. 4. FIG. 4 is a flowchart illustrating the mode determining process.

When system controller 10 executes the mode setting process, it is first determined whether current outdoor temperature Tout is lower than a first threshold value Tmax+α, which is obtained by adding α degrees (α is a real number greater than or equal to 0) to maximum target temperature Tmax, and higher than a second threshold value Tmin−ß, which is obtained by subtracting ß degrees (ß is a real number greater than or equal to 0) from minimum target temperature Tmin (S21). Parameters α and ß may be values previously stored in system controller 10, or may be changed from input and output terminal 19 by the user or the installer.

In the process of S21, it is also possible to determine whether or not current outdoor temperature Tout is lower than or equal to first threshold value Tmax+α, instead of determining whether or not current outdoor temperature Tout is lower than first threshold value Tmax+α. Also, in the process of S21, it is also possible to determine whether or not current outdoor temperature Tout is higher than or equal to second threshold value Tmin−ß, instead of determining whether or not current outdoor temperature Tout is higher than second threshold value Tmin−ß.

When current outdoor temperature Tout is substantially equal to either maximum target temperature Tmax or minimum target temperature Tmin, or within the range between maximum target temperature Tmax and minimum target temperature Tmin, it is considered to be in an intermediate season, which is neither the cooling season, in which habitable rooms 2a to 2d should be cooled, nor the heating season, in which habitable rooms 2a to 2d should be heated.

Accordingly, as a result of the process of S21, when it is determined that current outdoor temperature Tout is lower than the first threshold value and higher than the second threshold value (S21: Yes), system controller 10 determines that it is the intermediate season, and executes the processes of S22 and S23 to perform air conditioning that is suitable for the intermediate season for air conditioning room 18.

Specifically, in the process of S22, system controller 10 sets the operating mode for first AC 9a and second AC 9b to the cooling mode. Also in the same process, system controller 10 sets the cooling setpoint temperature for operation in the cooling mode to be a temperature that is obtained by adding ψ degrees (ψ is a real number greater than or equal to 0) to maximum target temperature Tmax.

In the subsequent process of S23, system controller 10 sets the operating mode for third AC 9c to the heating mode. Also in the same process, system controller 10 sets the heating setpoint temperature for operation in the heating mode to be a temperature that is obtained by subtracting ω degrees (ω is a real number greater than or equal to 0) from minimum target temperature Tmin.

It should be noted that parameters ψ and ω may be values previously stored in system controller 10, or may be changed from input and output terminal 19 by the user or the installer.

In the mode determining process, it is desirable the mode determination, that is, the determination as to whether it is the cooling season, the heating season, or the intermediate season, should be performed, for example, approximately at the time when the outdoor air temperature is highest of the day. The time at which the outdoor air temperature is highest is about 2 to 3 hours later than the culmination time, at which time the sun is farthest away from the horizon, in the northern hemisphere. To be precise, it is the northern culmination time in the southern hemisphere, but this is also referred to as the culmination time herein. Taking influence from the weather conditions into consideration, it is preferable that the mode determining process be performed within the range of about 4 hours before and after the culmination time. As a result, in such cases as Japan, for example, in an intermediate season in which the outdoor air temperature in the morning is about 12 degrees and the outdoor air temperature in the afternoon is about 24 degrees, it is possible to prevent the mode determining process from being carried out in the morning so that it is not erroneously determined as a heating season. Note that in this case, when the time is outside the subject time range, the mode determining process in the mode setting process in FIG. 3 is cancelled.

After the process of S23, system controller 10 ends the mode determining process and returns to the mode setting process.

By these processes of S22 and S23, when the temperature of air conditioning room 18 is higher than cooling setpoint temperature Tmax+ψ in an intermediate season, first AC 9a and second AC 9b cool the air in air conditioning room 18 so that the temperature of air conditioning room 18 becomes lower than or equal to cooling setpoint temperature Tmax+ψ. On the other hand, when the temperature of air conditioning room 18 is lower than heating setpoint temperature Tmin−ω, third AC 9c heats the air in air conditioning room 18 so that the temperature of air conditioning room 18 becomes higher than or equal to heating setpoint temperature Tmin−ω.

This allows the temperature of air conditioning room 18 to be kept between heating setpoint temperature Tmin−ω and cooling setpoint temperature Tmax+ψ. As a result, ventilating and air conditioning system 20 can keep the temperature of each of habitable rooms 2a to 2d to be at least within the range between heating setpoint temperature Tmin−ω and cooling setpoint temperature Tmax+ψ in an intermediate season. Thus, the operation of ventilating and air conditioning system 20 becomes predictable, so it becomes possible to perform stable controlling.

In cases where outdoor temperature Tout is within the range between heating setpoint temperature Tmin−ω and cooling setpoint temperature Tmax+ψ, system controller 10 can perform total ventilation, in which exhaust fans 5a to 5d exhaust the air while outdoor air intake fan 4 introduces the outdoor air, to bring the temperature of air conditioning room 18 to outdoor temperature Tout.

Specifically, when ventilation is performed in a high volume in the case where outdoor temperature Tout is higher than maximum target temperature Tmax or lower than minimum target temperature Tmin, the load on the air conditioners is high, and it is impossible to achieve low energy consumption. On the other hand, when outdoor temperature Tout is within the range between minimum target temperature Tmin and maximum target temperature Tmax, high load is not placed on the air conditioners, so both ventilation and temperature control are achieved with low energy consumption.

Accordingly, it is preferable that, when it is determined that it is the intermediate season and outdoor temperature Tout is within the range from minimum target temperature Tmin to maximum target temperature Tmax, mode setter 32 increase the outdoor air supply volume supplied to air conditioning room 18 by outdoor air intake fan 4 to be greater than when outdoor temperature Tout is higher than maximum target temperature Tmax and lower than minimum target temperature Tmin.

As a result, ventilating and air conditioning system 20 can control the temperature of each of habitable rooms 2a to 2d to be outdoor temperature Tout that is within heating setpoint temperature Tmin−ω and cooling setpoint temperature Tmax+ψ. In this case, all of first AC 9a, second AC 9b, and third AC 9c can be brought into an off-state, so the load on each of air conditioners 9a to 9c is reduced. Consequently, it is possible to achieve lower energy consumption and lengthen the lifetime of air conditioners 9a to 9c.

The description has shown a case in which, in an intermediate season, the cooling mode and the cooling setpoint temperature for operation in the cooling mode are set for first AC 9a and second AC 9b, and the heating mode and the heating setpoint temperature for operation in the heating mode is set for third AC 9c, in the processes of S22 and S23. However, the same advantageous effects can be obtained as those obtained in the present first exemplary embodiment when a cooling mode and a cooling setpoint temperature for operation in the cooling mode are set for at least one of the plurality of air conditioners 9a to 9c and a heating mode and a heating setpoint temperature for operation in the heating mode are set for at least another one.

Here, when the operating mode and the setpoint temperature for each of air conditioners 9a to 9c are set according to the processes of S22 and S23, the temperature of air conditioning room 18 becomes a predetermined temperature within the range between heating setpoint temperature Tmin−ω and cooling setpoint temperature Tmax+ψ. Accordingly, in this case, ventilating and air conditioning system 20 is difficult to control the temperature of each of habitable rooms 2a to 2d to be an individual target temperature such as to be variable over a wide temperature range. For this reason, ventilating and air conditioning system 20 controls the airflow volumes of conveying fans 3a to 3d so that it can change a sensible temperature. The details thereof will be described in a later-described airflow volume determining process with reference to FIG. 5.

On the other hand, as a result of the process of S21, when current outdoor temperature Tout is higher than or equal to the first threshold value but less than or equal to the second threshold value (S21: No), system controller 10 executes the process of S24, ends the mode determining process, and returns to the mode setting process.

In the process of S24, system controller 10 sets an operating mode and a setpoint temperature for each of first AC 9a, second AC 9b, and third AC 9c, based on the relationship between outdoor temperature Tout, maximum setpoint temperature CRmax, maximum target temperature Tmax, minimum target temperature Tmin, and minimum setpoint temperature CRmin. This enables ventilating and air conditioning system 20 to stably control the air in air conditioning room 18 without use of automatic operation of each of air conditioners 9a to 9c. Therefore, ventilating and air conditioning system 20 can be provided that makes it possible to perform stable control.

Figure 5:
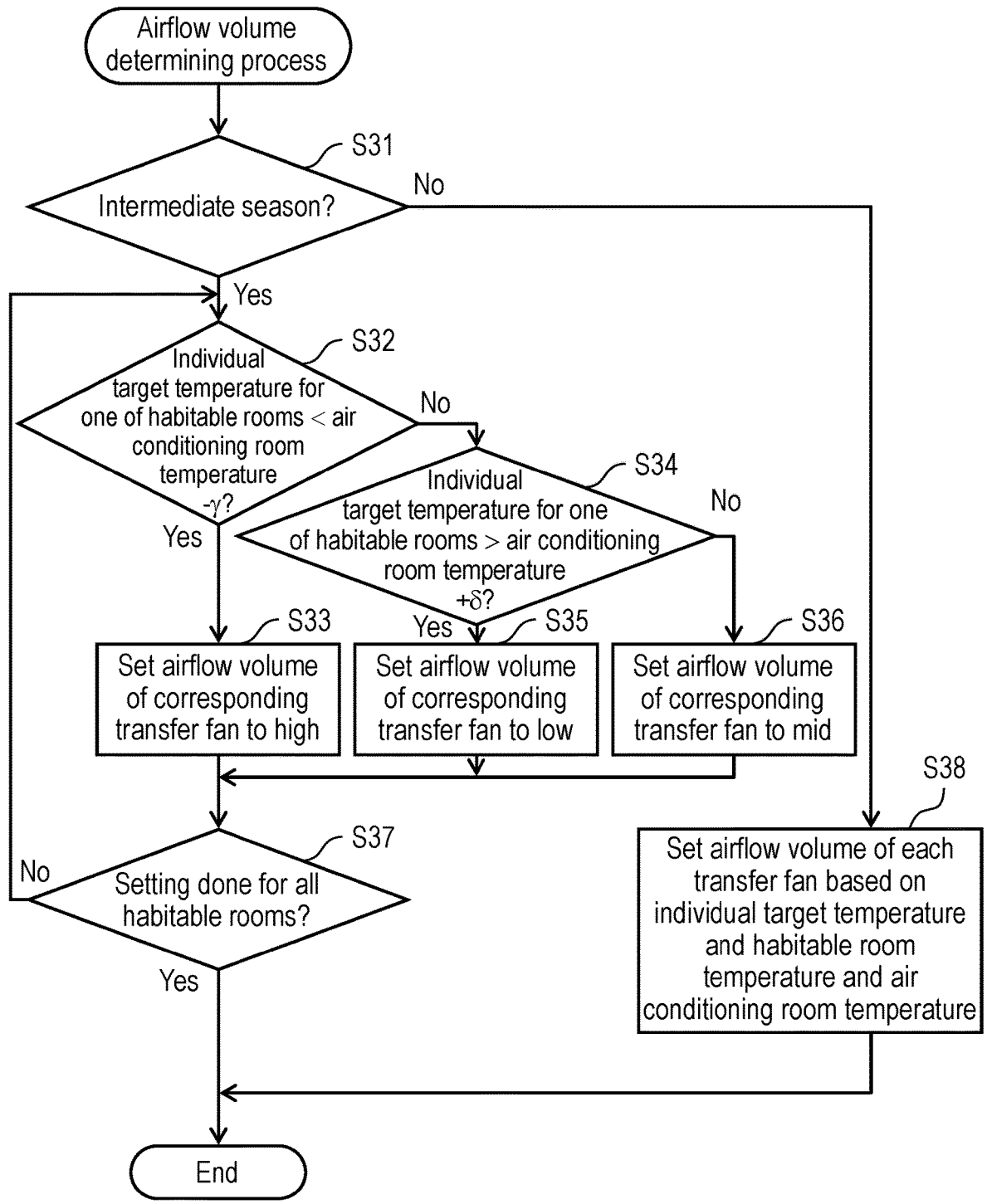
FIG. 5 is a flowchart illustrating an airflow volume determining process executed by the system controller.

Next, an airflow volume determining process executed by system controller 10 will be described with reference to FIG. 5. FIG. 5 is a flowchart illustrating the airflow volume determining process.

This airflow volume determining process is executed by system controller 10 at every second predetermined time (for example, every 10 minutes). System controller 10 constitutes airflow volume determiner 31 (see FIG. 2) by executing the airflow volume determining process.

When system controller 10 executes the airflow volume determining process, it is first determined by the process of S21 in the mode determining process (see FIG. 4) whether it is an intermediate season (S31). As a result, when it is determined that it is an intermediate season (S31: Yes), system controller 10 subsequently determines whether an individual target temperature that is set for one of habitable rooms 2a to 2d is lower than a third threshold value, which is obtained by subtracting $\gamma$ degrees ($\gamma$ is a real number greater than or equal to 0) from the temperature of air conditioning room 18 (i.e., air conditioning room temperature) (S32). Parameter $\gamma$ may be a value previously stored in system controller 10, or may be changed from input and output terminal 19 by the user or the installer.

Note that, in the process of S32, it is possible to determine whether the individual target temperature is lower than or equal to the third threshold value, instead of determining whether the individual target temperature is lower than the third threshold value.

As a result of the process of S32, when the individual target temperature that is set for one of the habitable rooms is lower than the third threshold value (S32; Yes), system controller 10 sets the airflow volume of one of conveying fans 3a to 3d that corresponds to the one of the habitable rooms to be "High" (S33).

The case where "the individual target temperature that is set for one of the habitable rooms is lower than the third threshold value" means the case where the individual target temperature is lower than the temperature of air conditioning room 18; however, it is impossible to make the temperature of the one of the habitable rooms lower than the temperature of air conditioning room 18. Nevertheless, when the airflow volume of the conveying fan for the one of the habitable rooms is set "High" by the process of S33, a large air flow occurs in the habitable room, allowing the sensible temperature to lower. As a result, the user is allowed to feel the user's desired temperature.

Note that the phrase "the airflow volume of a conveying fan is set to "High"" means that, among the multiple levels of airflow volumes that are available to the conveying fan, the airflow volume of the conveying fan is set to one that is greater than the average value or the median value of the available airflow volumes. When a plurality of airflow volumes that are greater than the average value or the median value of the airflow volumes are available, the greater the difference between the temperature of air conditioning room 18 and the individual target temperature, the greater the airflow volume may be set as the airflow volume of the corresponding conveying fan.

On the other hand, as a result of the process of S32, when it is determined that the individual target temperature that is set for the one of the habitable rooms is higher than or equal to the third threshold value (S32: No), system controller 10 determines whether the individual target temperature that is set for the one of the habitable rooms is higher than or equal to a fourth threshold value, which is obtained by adding $\delta$ degrees ($\delta$ is a real number greater than or equal to 0) to the temperature of air conditioning room 18 (i.e., air conditioning room temperature) (S34). Parameter $\delta$ may be a value previously stored in system controller 10, or may be changed from input and output terminal 19 by the user or the installer.

Note that, in the process of S34, it is possible to determine whether the individual target temperature is higher than or equal to the fourth threshold value, instead of determining whether the individual target temperature is higher than the fourth threshold value.

As a result of the process of S34, when it is determined that the individual target temperature that is set for one of the habitable rooms is higher than the fourth threshold value (S34: Yes), system controller 10 sets the airflow volume of one of conveying fans 3a to 3d that corresponds to the one of the habitable rooms to be "Low" (S35).

The case where "the individual target temperature that is set for one of the habitable rooms is higher than the fourth threshold value" means that the individual target temperature is higher than the temperature of air conditioning room 18; however, it is impossible to make the temperature of the one of the habitable rooms higher than the temperature of air conditioning room 18. Nevertheless, when the airflow volume of the conveying fan for the one of the habitable rooms is set "Low" by the process of S35, the air flow in the habitable room is reduced, and the sensible temperature is increased. As a result, the user is allowed to feel the user's desired temperature.

Note that the phrase "the airflow volume of a conveying fan is set to "Low"" means that, among the multiple levels of airflow volumes that are available to the conveying fan, the airflow volume of the conveying fan is set to one that is less than the average value or the median value of the available airflow volumes. When a plurality of airflow volumes that are less than the average value or the median value of the airflow volumes are available, the greater the difference between the temperature of air conditioning room 18 and the individual target temperature, the less the airflow volume may be set as the airflow volume of the corresponding conveying fan.

On the other hand, as a result of the process of S34, when it is determined that the individual target temperature that is set for the one of the habitable rooms is less than or equal to the fourth threshold value (S34: No), it means that the individual target temperature of the one of the habitable rooms is substantially equal to the air conditioning room temperature. When this is the case, ventilating and air conditioning system 20 is able to bring the temperature of the one of the habitable rooms close to the individual target temperature, and therefore, system controller 10 sets the airflow volume of the conveying fan 3a to 3d that corresponds to the one of the habitable rooms to "Mid" (S36). Thus, ventilating and air conditioning system 20 prevents the sensible temperature from undesirably rising and falling to allow the user to feel a comfortable temperature.

Note that the phrase "the airflow volume of a conveying fan is set to "Mid"" means that, among the multiple levels of airflow volumes that are available to the conveying fan, the airflow volume of the conveying fan is set to an airflow volume that is close to the average value of the available airflow volumes or an airflow volume that is the median value thereof.

When system controller 10 executes the processes of S33, S35, or S36, system controller 10 next determines whether the airflow volumes for corresponding conveying fans 3a to 3d have been set for all of habitable rooms 2a to 2d (S37). As a result, when there remains a habitable room for which the airflow volume of a corresponding one of conveying fans 3a to 3d has not yet been set (S37: No), system controller 10 returns to the process of S32. Then, system controller 10 executes the processes of S32 to S36 for the one of the habitable rooms for which the airflow volume of the corresponding one of conveying fans 3a to 3d has not yet been set.

On the other hand, when it is determined that the airflow volumes of corresponding conveying fans 3a to 3d have been set for all of habitable rooms 2a to 2d (S37: Yes), system controller 10 ends the airflow volume determining process.

Moreover, when it is determined that it is not the intermediate season (S31: No), system controller 10 sets the airflow volumes of conveying fans 3a to 3d, which respectively correspond to habitable rooms 2a to 2d, based on the respective individual target temperatures for habitable rooms 2a to 2d, the respective current temperatures of habitable rooms 2a to 2d, and the temperature of air conditioning room 18 (S38).

For example, when the current temperature of one of the habitable rooms is higher than the individual target temperature that is set for the one of the habitable rooms, the airflow volume of the corresponding conveying fan is set higher under the condition that the temperature of air conditioning room 18 is lower than the current temperature. In addition, the airflow volume thereof is set so that the greater the difference between the individual target temperature and the current temperature of the habitable room, the higher the airflow volume will be. On the other hand, when the temperature of air conditioning room 18 is higher than the current temperature of the one of the habitable rooms, the airflow volume of the corresponding conveying fan is set to zero, so as to prevent the temperature of the one of the habitable rooms from becoming even higher.

In addition, when the current temperature of one of the habitable rooms is lower than the individual target temperature that is set for the one of the habitable rooms, the airflow volume of the corresponding conveying fan is set higher under the condition that the temperature of air conditioning room 18 is higher than the current temperature. In addition, the airflow volume thereof is set so that the greater the difference between the individual target temperature and the current temperature of the habitable room, the higher the airflow volume will be. On the other hand, when the temperature of air conditioning room 18 is lower than the current temperature of the one of the habitable rooms, the airflow volume of the corresponding conveying fan is set to zero, so as to prevent the temperature of the one of the habitable rooms from becoming even lower.

After the process of S38, system controller 10 ends the airflow volume determining process.

As described above, ventilating and air conditioning system 20 according to the first exemplary embodiment allows mode setter 32 to set, for each of the plurality of independent air conditioners 9a to 9c, a cooling mode and a cooling setpoint temperature for operation in the cooling mode or a heating mode and a heating setpoint temperature for operation in the heating mode, based on the individual target temperatures of each of the plurality of habitable rooms 2a to 2d acquired from input and output terminal 19 and the outdoor temperature acquired by outdoor temperature sensor 7.

Then, the air of air in air conditioning room 18 that is air-conditioned based on the settings set by mode setter 32 is transferred to habitable rooms 2a to 2d independently at the airflow volumes of conveying fans 3a to 3d that are determined by airflow volume determiner 31, by means of fan airflow volume controller 33.

This makes it possible to set the cooling mode and the cooling setpoint temperature, or the heating mode and the heating setpoint temperature, independently for the plurality of air conditioners 9a to 9c. As a result, air conditioning of air conditioning room 18 can be controlled stably without use of automatic operation of air conditioners 9a to 9c. Therefore, ventilating and air conditioning system 20 can be provided that makes it possible to perform stable control.

In particular, in ventilating and air conditioning system 20 according to the first exemplary embodiment, first AC 9a and second AC 9b are set to the cooling mode and $Tmax+\psi$ is set as the cooling setpoint temperature for operation in the cooling mode when it is determined to be an intermediate season, based on the respective individual target temperatures of habitable rooms 2a to 2d and the outdoor temperature. On the other hand, third AC 9c is set to the heating mode and $Tmin-\omega$ is set as the heating setpoint temperature for operation in the heating mode.

This allows the temperature of air conditioning room 18 to be kept between heating setpoint temperature $Tmin-\omega$ and cooling setpoint temperature $Tmax+\psi$ in an intermediate season. Therefore, in the intermediate season, ventilating and air conditioning system 20 can keep the temperature of each of habitable rooms 2a to 2d to be at least within the range between heating setpoint temperature $Tmin-\omega$ and cooling setpoint temperature $Tmax+\psi$. Thus, the operation of ventilating and air conditioning system 20 becomes predictable, so it becomes possible to perform stable controlling.

In addition, because the mode setting process of setting the operating mode for each of air conditioners 9a to 9c is to be executed at every predetermined time, the operating mode for air conditioners 9a to 9c is not changed for a predetermined time after the cooling mode or the heating mode is set for each of air conditioners 9a to 9c. This prevents frequent switching of operating mode for each of air conditioners 9a to 9c, inhibiting the lifetime of air conditioners 9a to 9c from being shortened.

Second Exemplary Embodiment

Next, ventilating and air conditioning system 20 according to a second exemplary embodiment, which is another embodiment of the air conditioning system of the present disclosure, will be described with reference to FIG. 6.

For ventilating and air conditioning system 20 according to the first exemplary embodiment, it has been described that, when it is determined to be an intermediate season, the cooling setpoint temperature of first AC 9a and second AC 9b set in the cooling mode is set to be maximum target temperature Tmax and the heating setpoint temperature of third AC 9c set in the heating mode is set to be minimum target temperature Tmin.

In contrast, ventilating and air conditioning system 20 according to the second exemplary embodiment sets the cooling setpoint temperature for first AC 9a and second AC 9b set to the cooling mode and the heating setpoint temperature for third AC 9c set to the heating mode to be a temperature based on average target temperature Tave, which is the average value of the individual target temperatures, which are set respectively for habitable rooms 2a to 2d, when it is determined to be an intermediate season.

In the following, ventilating and air conditioning system 20 according to the second exemplary embodiment is described, focusing primarily on the differences from ventilating and air conditioning system 20 according to the first exemplary embodiment. The same elements as those in ventilating and air conditioning system 20 according to the first exemplary embodiment are designated by the same reference characters, and description thereof will not be repeated.

Figure 6:
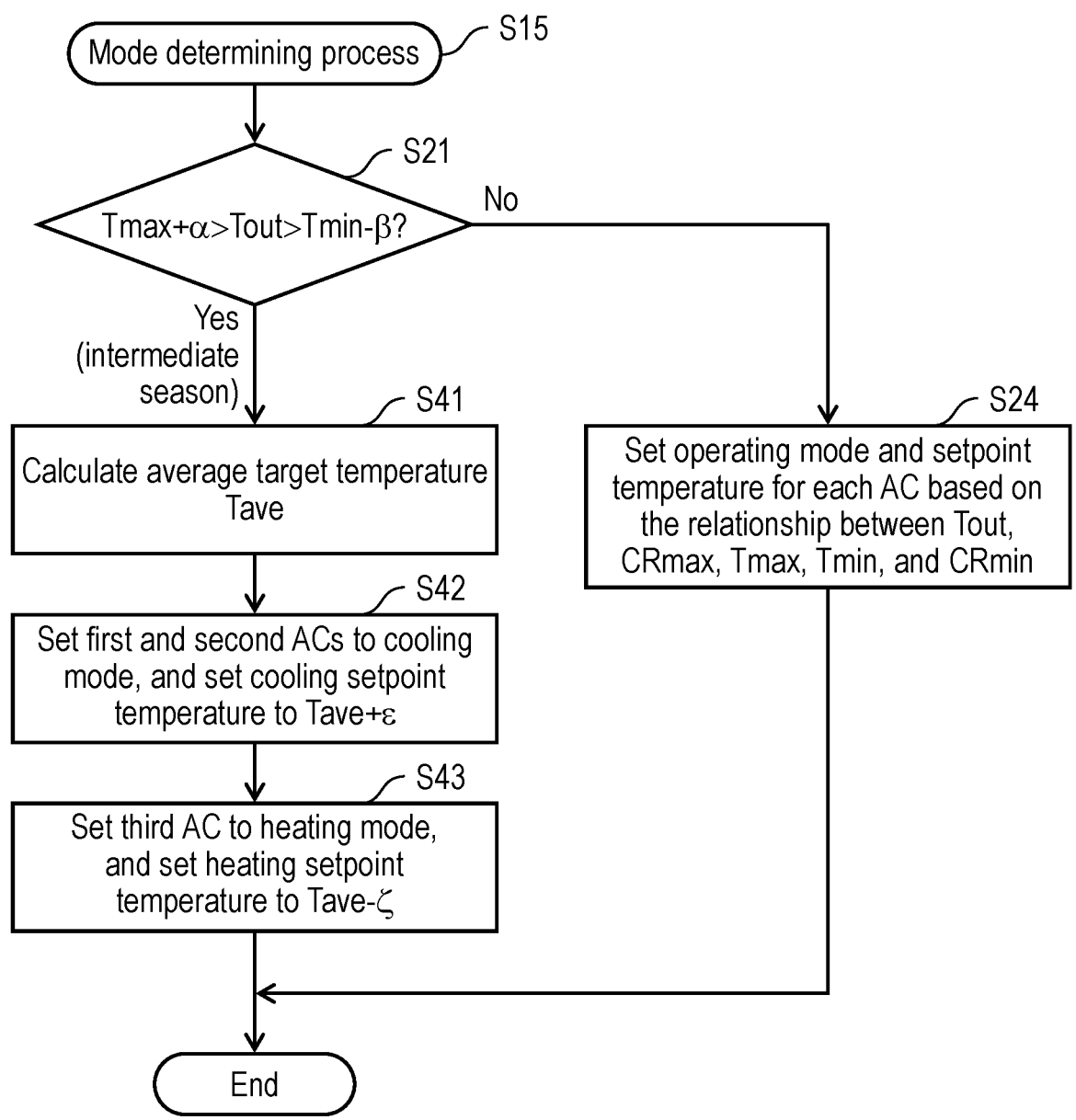
FIG. 6 is a flowchart illustrating a mode determining process executed by a system controller of a ventilating and air conditioning system according to a second exemplary embodiment of the disclosure.

FIG. 6 is a flowchart illustrating a mode determining process executed as the process of S15 in the mode setting process (see FIG. 3) by system controller 10 of ventilating and air conditioning system 20 according to the second exemplary embodiment.

A difference of this mode determining process from the mode determining process executed by system controller 10 according the first exemplary embodiment is that the processes of S41 to S43 are executed instead of the processes of S22 and S23 when it is determined by the process of S21 that it is an intermediate season (S21: Yes).

First, in the process of S41, system controller 10 calculates average target temperature Tave, which is the average value of individual target temperatures that are set respectively for habitable rooms 2a to 2d. Next, in the process of S42, system controller 10 sets the operating mode of first AC 9a and second AC 9b to be the cooling mode, and sets the cooling setpoint temperature for operation in the cooling mode to be a temperature obtained by adding ε degrees (ε is a real number greater than or equal to 0) to average target temperature Tave. Note that, however, cooling setpoint temperature Tave+ε should be set to a temperature lower than maximum target temperature Tmax.

Also, in the subsequent process of S43, system controller 10 sets the operating mode of third AC 9c to be the heating mode, and sets the heating setpoint temperature for operation in the heating mode to be a temperature obtained by subtracting degrees is a real number greater than or equal to 0) from average target temperature Tave. Note that, however, heating setpoint temperature Tave-ζ should be set to a temperature higher than minimum target temperature Tmin. After the process of S43, system controller 10 ends the mode determining process and returns to the mode setting process.

It should be noted that parameters ε and ζ may be values previously stored in system controller 10, or may be changed from input and output terminal 19 by the user or the installer.

As described above, in ventilating and air conditioning system 20 according to the second exemplary embodiment, first AC 9a and second AC 9b are set to the cooling mode and Tave+ε is set as the cooling setpoint temperature for operation in the cooling mode when it is determined to be an intermediate season, based on the respective individual target temperatures of habitable rooms 2a to 2d and the outdoor temperature. On the other hand, third AC 9c is set to the heating mode and Tave-ζ is set as the heating setpoint temperature for operation in the heating mode. Thus, the cooling mode and the cooling setpoint temperature, or the heating mode and the heating setpoint temperature, can be set independently for the plurality of air conditioners 9a to 9c. As a result, air conditioning of air conditioning room 18 can be controlled stably without use of automatic operation of air conditioners 9a to 9c. Therefore, ventilating and air conditioning system 20 can be provided that makes it possible to perform stable control.

In addition, with the settings of air conditioners 9a to 9c, when the temperature of air conditioning room 18 is higher than cooling setpoint temperature Tave+ε, first AC 9a and second AC 9b cool the air in air conditioning room 18 so that the temperature of air conditioning room 18 becomes lower than or equal to cooling setpoint temperature Tave+ε. On the other hand, when the temperature of air conditioning room 18 is lower than heating setpoint temperature Tave-ζ, third AC 9c heats the air in air conditioning room 18 so that the temperature of air conditioning room 18 becomes higher than or equal to heating setpoint temperature Tave-ζ.

This allows the temperature of air conditioning room 18 to be kept between heating setpoint temperature Tave-ζ and cooling setpoint temperature Tave+ε. As a result, ventilating and air conditioning system 20 can keep the temperature of each of habitable rooms 2a to 2d to be a temperature at least in the neighborhood of average target temperature Tave in an intermediate season. Thus, the operation of ventilating and air conditioning system 20 becomes predictable, so it becomes possible to perform stable controlling.

Then, because the temperature of each of habitable rooms 2a to 2d is brought close to average target temperature Tave, which is the average value of the individual target temperatures that are set respectively for habitable rooms 2a to 2d, the temperature of each of habitable rooms 2a to 2d is prevented from considerably deviating from the individual target temperature that is set for each of habitable rooms 2a to 2d.

Furthermore, because parameters ε and ζ are set to a positive number, not zero, it is possible to provide some range between heating setpoint temperature Tave-ζ and cooling setpoint temperature Tave+ε. The temperature sensors provided for air conditioners 9a to 9c show some detection errors. Therefore, when the heating setpoint temperature and the cooling setpoint temperature are set to be the same temperature, one air conditioner set to the heating mode and another air conditioner set to the cooling mode operate simultaneously toward the same setpoint temperature, which may unnecessarily increase energy consumption.

In view of this, when some range is provided between heating setpoint temperature Tave-ζ and cooling setpoint temperature Tave+ε, it is possible to prevent the simultaneous operation of an air conditioner that is set to the heating mode and another that is set to the cooling mode, which is due to detection errors of temperature sensors, to reduce energy consumption.

On the other hand, when parameters ε and ζ are set to 0, ventilating and air conditioning system 20 can set both the heating setpoint temperature and the cooling setpoint temperature to be the same average target temperature Tave. This allows the temperature of each of habitable rooms 2a to 2d to be targeted to the average target temperature Tave in an intermediate season. Thus, it is possible that ventilating and air conditioning system 20 can perform more stable controlling.

It should be noted that the same advantageous effects can be obtained as those obtained in the present second exemplary embodiment when a cooling mode and a cooling setpoint temperature for operation in the cooling mode are set for at least one of the plurality of air conditioners 9a to 9c and a heating mode and a heating setpoint temperature for operation in the heating mode are set for at least another one in the second exemplary embodiment as well as in the first exemplary embodiment.

In other respects, ventilating and air conditioning system 20 according to the second exemplary embodiment has similar configurations to those of ventilating and air conditioning system 20 according to the first exemplary embodiment, and provides the same advantageous effects.

Third Exemplary Embodiment

Next, ventilating and air conditioning system 20 according to a third exemplary embodiment, which is another embodiment of the air conditioning system of the present disclosure, will be described with reference to FIGS. 7 and 8.

For ventilating and air conditioning system 20 according to the first and second exemplary embodiments, it has been described that, when it is determined to be an intermediate season, both the cooling setpoint temperature of first AC 9a and second AC 9b set in the cooling mode and the heating setpoint temperature of third AC 9c set in the heating mode are set to predetermined fixed values.

In contrast, when it is determined to be an intermediate season, ventilating and air conditioning system 20 according to the third exemplary embodiment calculates an absolute value of the difference between the temperature acquired by each of habitable room temperature sensors 11a to 11d and the individual target temperature for each of habitable rooms 2a to 2d, and sets the setpoint temperature for air conditioners 9a to 9c to be a temperature such as to cause the temperature of one of the habitable rooms with the greatest absolute value to reach the target temperature for the habitable room.

In addition, ventilating and air conditioning system 20 according to the third exemplary embodiment sets the airflow volume of one of conveying fans 3a to 3d that corresponds to the one of the habitable rooms with the greatest absolute value to be "High" in the intermediate season. Also, ventilating and air conditioning system 20 according to the third exemplary embodiment sets the airflow volumes of the other conveying fans based on the individual target temperatures and the current temperatures of corresponding habitable rooms and the temperature of air conditioning room 18 in the intermediate season.

In the following, ventilating and air conditioning system 20 according to the third exemplary embodiment is described, focusing primarily on the differences from ventilating and air conditioning system 20 according to the first exemplary embodiment. The same elements as those in ventilating and air conditioning system 20 according to the first exemplary embodiment are designated by the same reference characters, and description thereof will not be repeated.

Figure 7:
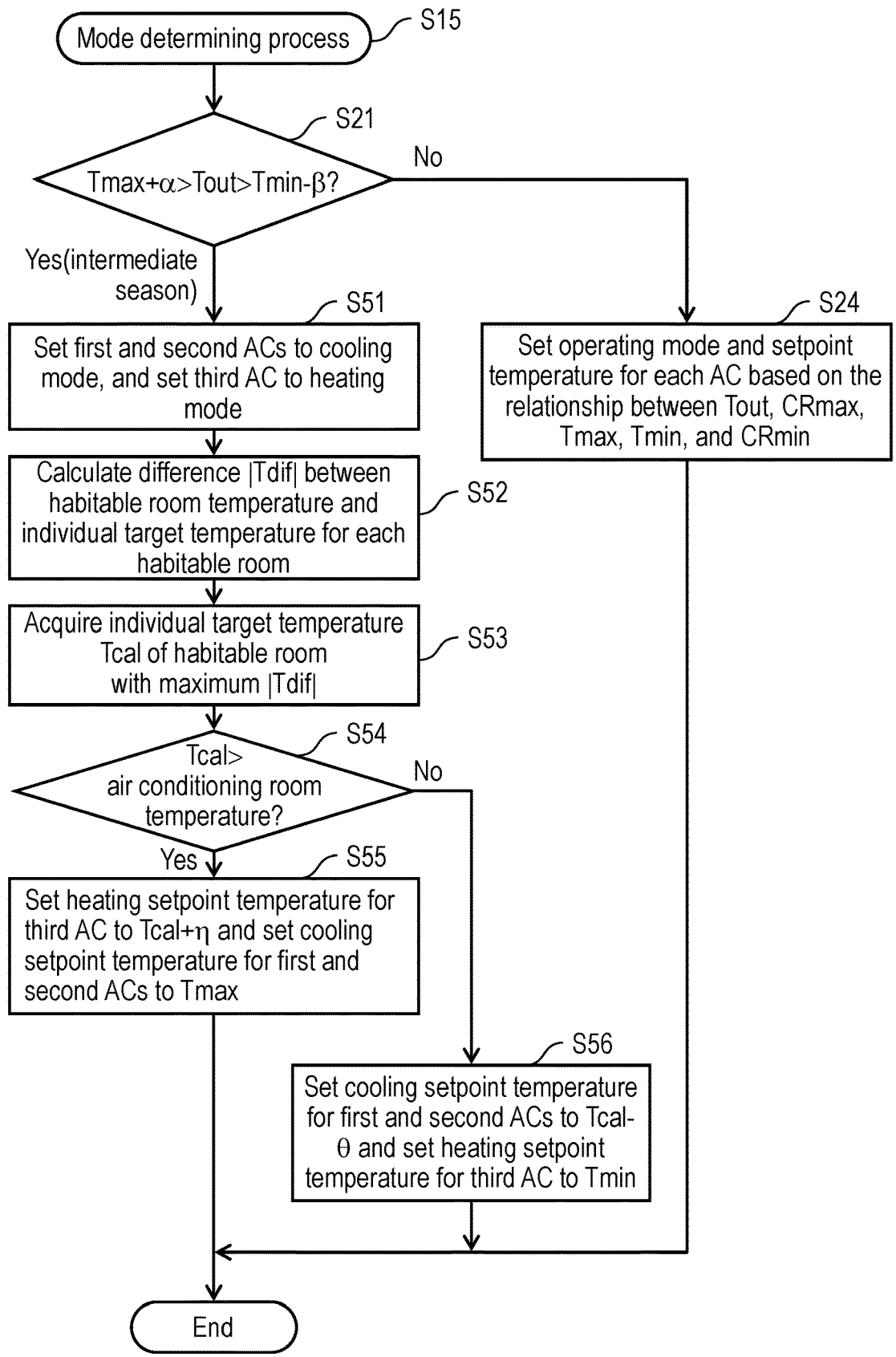
FIG. 7 is a flowchart illustrating a mode determining process executed by a system controller of a ventilating and air conditioning system according to a third exemplary embodiment of the disclosure.
Figure 8:
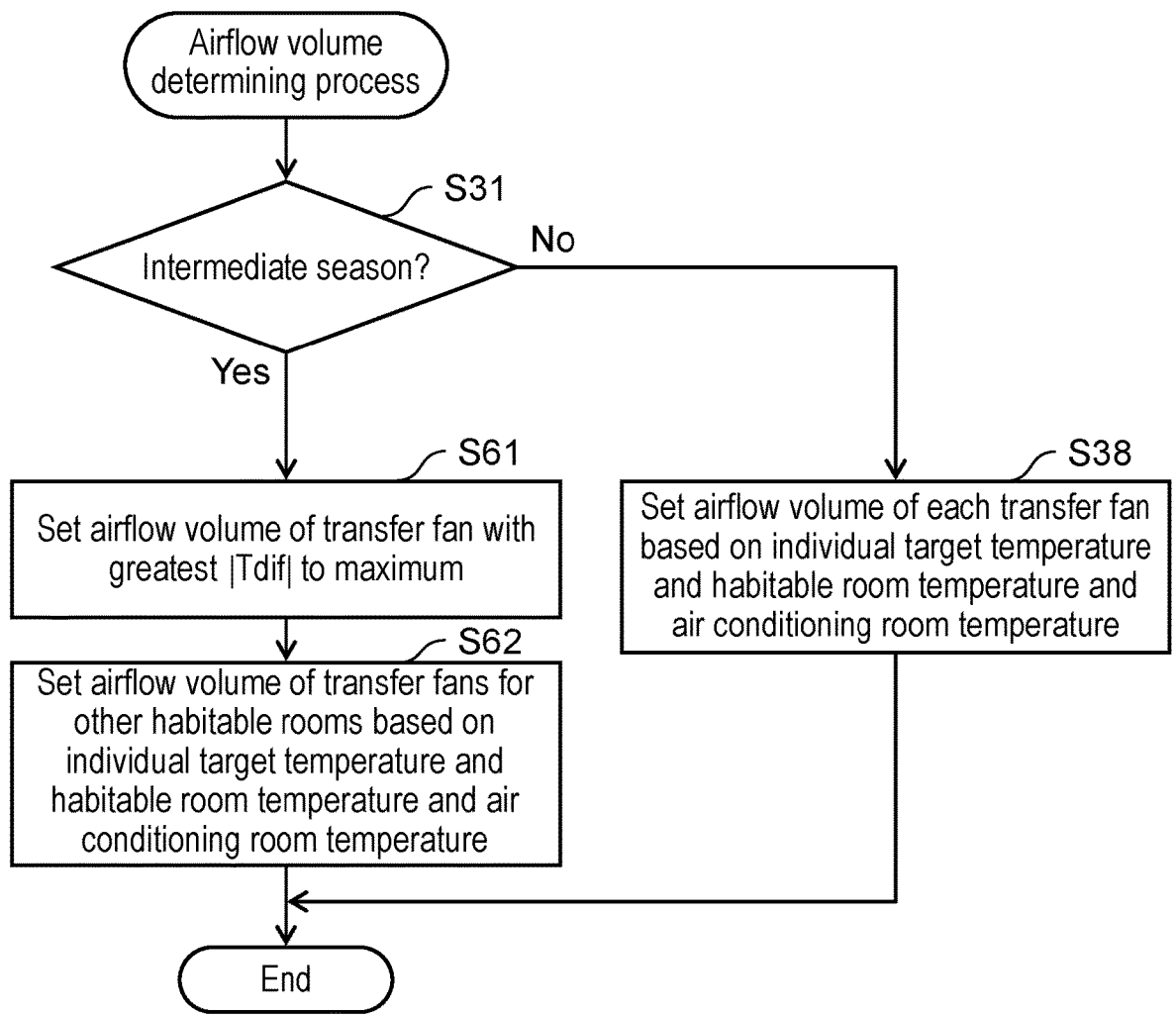
FIG. 8 is a flowchart illustrating an airflow volume determining process executed by the system controller.

FIG. 7 is a flowchart illustrating a mode determining process executed as the process of S15 in the mode setting process (see FIG. 3) by system controller 10 of ventilating and air conditioning system 20 according to the third exemplary embodiment.

A difference of this mode determining process from the mode determining process executed by system controller 10 according the first exemplary embodiment is that the processes of S51 to S56 are executed instead of the processes of S22 and S23 when it is determined by the process of S21 that it is an intermediate season (S21: Yes).

First, in the process of S51, system controller 10 sets first AC 9a and second AC 9b to the cooling mode and third AC 9c to the heating mode.

Next, system controller 10 calculates, for each of habitable rooms 2a to 2d, absolute value |Tdif| of difference Tdif between the temperature acquired by habitable room temperature sensors 11a to 11d and the individual target temperature for the habitable room (S52).

Then, system controller 10 acquires, as the target temperature Tcal, the individual target temperature for one of habitable rooms 2a to 2d in which absolute value |Tdif| between the temperature and the individual target temperature of the habitable room is greatest, which is calculated by the process of S52 (S53).

Next, system controller 10 determines whether or not target temperature Tcal acquired by the process of S53 is higher than the temperature of air conditioning room 18 (S54). Note that in the process of S54, it is also possible to determine whether or not target temperature Tcal is greater than or equal to the temperature of air conditioning room 18.

As a result of the process of S54, when it is determined that target temperature Tcal is higher than the temperature of air conditioning room 18 (S54: Yes), system controller 10 executes the process of S55.

In the process of S55, system controller 10 sets the heating setpoint temperature for third AC 9c that is set to the heating mode to be a temperature obtained by adding η degrees (η is a real number greater than or equal to 0) to target temperature Tcal. In addition, in the process of S55, system controller 10 sets maximum target temperature Tmax as the cooling setpoint temperature for first AC 9a and second AC 9b that are set to the cooling mode. After the process of S55, system controller 10 ends the mode determining process and returns to the mode setting process.

On the other hand, as a result of the process of S54, when it is determined that target temperature Tcal is lower than the temperature of air conditioning room 18 (S54: No), system controller 10 executes the process of S56.

In the process of S56, system controller 10 sets the cooling setpoint temperature for first AC 9a and second AC 9b that are set to the cooling mode to be a temperature obtained by subtracting θ degrees (θ is a real number greater than or equal to 0) from target temperature Tcal. Also in the process of S56, system controller 10 sets minimum target temperature Tmin as the heating setpoint temperature for third AC 9c that is set to the heating mode. After the process of S56, system controller 10 ends the mode determining process and returns to the mode setting process.

Thus, when the individual target temperature Tcal for the habitable room with the greatest absolute value |Tdif| of the difference between the temperature of the habitable room and the individual target temperature is higher than the temperature of air conditioning room 18 in the intermediate season, the heating setpoint temperature for third AC 9c that is set to the heating mode is set by the process of S55 to be higher than or equal to the individual target temperature Tcal of the habitable room. Thereby, the air of air conditioning room 18 is heated by third AC 9c so that the temperature of air conditioning room 18 becomes higher than or equal to the target temperature Tcal of the habitable room with the greatest absolute value |Tdif| of the difference. As a result, ventilating and air conditioning system 20 is able to control the one of the habitable rooms with the greatest absolute value |Tdif| of the difference between the temperature of the habitable room and the individual target temperature to first become the individual target temperature.

In addition, when the individual target temperature Tcal for the habitable room with the greatest absolute value |Tdif| of the difference between the temperature of the habitable room and the individual target temperature is lower than or equal to the temperature of air conditioning room 18 in the intermediate season, the cooling setpoint temperature for first AC 9a and second AC 9b that are set to the cooling mode is set by the process of S56 to be lower than or equal to the individual target temperature Tcal of the habitable room. Thereby, the air of air conditioning room 18 is cooled by first AC 9a and second AC 9b so that the temperature of air conditioning room 18 becomes less than or equal to the target temperature Tcal of the habitable room with the greatest absolute value |Tdif| of the difference. As a result, ventilating and air conditioning system 20 is able to control the one of the habitable rooms with the greatest absolute value |Tdif| of the difference between the temperature of the habitable room and the individual target temperature to first become the individual target temperature.

Accordingly, ventilating and air conditioning system 20 is able to control the one of the habitable rooms whose temperature is deviated most from the individual target temperature to first become the individual target temperature in the intermediate season.

This mode determining process is one of the processes in the mode setting process that is executed every predetermined time. That is, when the temperature of one of the habitable rooms that is considerably deviated from the individual target temperature is brought close to the individual target temperature, a control operation is performed for bringing another one of the habitable rooms that is considerably deviated from the individual target temperature close to the individual target temperature. As a result, ventilating and air conditioning system 20 is able to bring the temperatures of the habitable rooms closer to the individual target temperatures in the order how the temperature of the habitable room is deviated from the individual target temperature.

This enables ventilating and air conditioning system 20 to quickly eliminate the presence of a habitable room whose temperature is deviated from the individual target temperature.

Note that in the process of S55, the cooling setpoint temperature for first AC 9a and second AC 9b is set to maximum target temperature Tmax. However, in this case, the temperature of air conditioning room 18 should be raised to target temperature Tcal, so first AC 9a and second AC 9b substantially do not operate. For that reason, system controller 10 may set the cooling setpoint temperature for first AC 9a and second AC 9b to be higher than or equal to the target temperature Tcal in the process of S55. Also, in this case, system controller 10 may turn off the operation itself of first AC 9a and second AC 9b, or may set the operating mode of first AC 9a and second AC 9b to the heating mode and their heating setpoint temperature to the same temperature Tcal+η as the heating setpoint temperature for third AC 9c.

Likewise, in the process of S56, the heating setpoint temperature for third AC 9c is set to minimum target temperature Tmin. However, in this case, the temperature of air conditioning room 18 should be lowered to target temperature Tcal, so third AC 9c substantially does not operate. For that reason, system controller 10 may set the heating setpoint temperature for third AC 9c to be lower than or equal to the target temperature Tcal in the process of S56. Also, in this case, system controller 10 may turn off the operation itself of third AC 9c, or may set the operating mode of third AC 9c to the cooling mode and its cooling setpoint temperature to the same temperature Tcal−θ as the cooling setpoint temperature for first AC 9a and second AC 9b.

Moreover, the same advantageous effects can be obtained in the third exemplary embodiment when a cooling mode and a cooling setpoint temperature for operation in the cooling mode are set for at least one of the plurality of air conditioners 9a to 9c and a heating mode and a heating setpoint temperature for operation in the heating mode are set for at least another one, as in the first and second exemplary embodiments.

Next, an airflow volume determining process executed by system controller 10 of ventilating and air conditioning system 20 according to the third exemplary embodiment will be described with reference to FIG. 8. FIG. 8 is a flowchart illustrating the airflow volume determining process.

A difference of this airflow volume determining process from the airflow volume determining process executed by system controller 10 according the first exemplary embodiment is that the processes of S61 and S62 are executed instead of the processes of S32 to S37, when it is determined by the process of S31 that it is an intermediate season (S31: Yes).

First, in the process of S61, system controller 10 sets the airflow volume of one of conveying fans 3a to 3d that corresponds to the habitable room with the greatest absolute value |Tdif| between the temperature of the habitable room and the individual target temperature, which has been determined by the process of S53 in the mode determining process, to maximum. Herein, the phrase "the airflow volume of a conveying fan is set to maximum" means that, among the multiple levels of airflow volumes that are available to the conveying fan, the airflow volume of the conveying fan is set to the maximum airflow volume.

As described above, system controller 10 controls air conditioning of air conditioning room 18 in an intermediate season so that one of the habitable rooms with the greatest absolute value |Tdif| of the difference between the temperature of the habitable room and the individual target temperature to first become the individual target temperature. Moreover, by this airflow volume determining process, system controller 10 sets the airflow volume of one of the conveying fans that corresponds to the habitable room with the greatest absolute value |Tdif| between the temperature of the habitable room and the individual target temperature, to maximum. Accordingly, ventilating and air conditioning system 20 is able to control the one of the habitable rooms whose temperature is deviated most from the individual target temperature to more quickly become the individual target temperature in the intermediate season.

In the subsequent process of S62, system controller 10 sets the airflow volume of the conveying fans corresponds to other habitable rooms based on the respective individual target temperatures for habitable rooms 2a to 2d, the respective current temperatures of habitable rooms 2a to 2d, and the temperature of air conditioning room 18, as in S38. This allows the air in air conditioning room 18 to be transferred appropriately to the other habitable rooms, and serves to prevent the temperature of the habitable room from rather deviating from the individual target temperature because of the air in air conditioning room 18 that is controlled to fit the habitable room with the greatest absolute value |Tdif| of the difference between the temperature of the habitable room and the individual target temperature.

As described above, when it is determined to be an intermediate season, ventilating and air conditioning system 20 according to the third exemplary embodiment sets the setpoint temperatures for air conditioners 9a to 9c to be the temperatures such as to cause the habitable room with the greatest absolute value |Tdif| of the difference between the temperature of the habitable room and the individual target temperature of the habitable room to reach the target temperature of the habitable room. This enables ventilating and air conditioning system 20 to quickly eliminate the presence of a habitable room whose temperature is deviated from the individual target temperature in the intermediate season.

In other respects, ventilating and air conditioning system 20 according to the third exemplary embodiment has similar configurations to those of ventilating and air conditioning system 20 according to the first and second exemplary embodiments, and provides the same advantageous effects.

Fourth Exemplary Embodiment

Next, ventilating and air conditioning system 20 according to a fourth exemplary embodiment, which is another embodiment of the air conditioning system of the present disclosure, will be described with reference to FIG. 9.

For ventilating and air conditioning system 20 according to the first to third exemplary embodiments, the description is made about settings of the operating modes and the setpoint temperatures for air conditioners 9a to 9c when it is determined to be an intermediate season. In contrast, ventilating and air conditioning system 20 according to the fourth exemplary embodiment illustrates one exemplary embodiment of the operating modes and the setpoint temperatures for air conditioners 9a to 9c when it is determined to be the cooling season.

In the following, ventilating and air conditioning system 20 according to the fourth exemplary embodiment is described, focusing primarily on the differences from ventilating and air conditioning system 20 according to the first exemplary embodiment. The same elements as those in ventilating and air conditioning system 20 according to the first exemplary embodiment are designated by the same reference characters, and description thereof will not be repeated.

Figure 9:
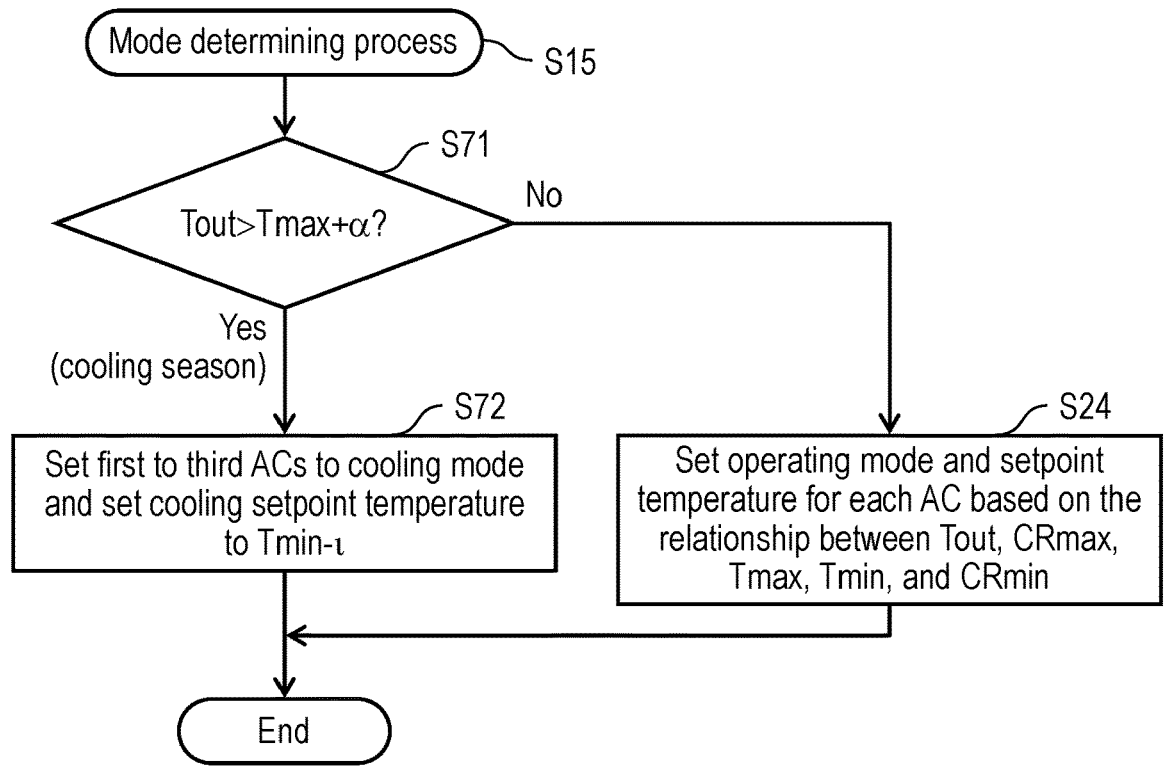
FIG. 9 is a flowchart illustrating a mode determining process executed by a system controller of a ventilating and air conditioning system according to a fourth exemplary embodiment of the disclosure.

FIG. 9 is a flowchart illustrating a mode determining process executed as the process of S15 in the mode setting process (see FIG. 3) by system controller 10 of ventilating and air conditioning system 20 according to the fourth exemplary embodiment.

When system controller 10 executes this mode determining process, it is first determined whether current outdoor temperature Tout is higher than first threshold value Tmax+$\alpha$, which is obtained by adding a degrees (a is a real number greater than or equal to 0) to maximum target temperature Tmax (S71). Parameter $\alpha$ may be a value previously stored in system controller 10, or may be changed from input and output terminal 19 by the user or the installer.

In the process of S71, it is also possible to determine whether current outdoor temperature Tout is higher than or equal to first threshold value Tmax+$\alpha$, instead of determining whether or not current outdoor temperature Tout is higher than first threshold value Tmax+$\alpha$.

When current outdoor temperature Tout is higher than the first threshold value that is higher than or equal to maximum target temperature Tmax, it is considered to be the cooling season, in which habitable rooms 2a to 2d should be cooled. Accordingly, as a result of the process of S71, when it is determined that current outdoor temperature Tout is higher than the first threshold value (S71: Yes), system controller 10 determines that it is the cooling season, and executes the processes of S72 to perform air conditioning that is suitable for the cooling season for air conditioning room 18.

Specifically, in the process of S72, system controller 10 sets the operating mode for all of first AC 9a, second AC 9b, and third AC 9c to the cooling mode. Also in the same process, system controller 10 sets, for these air conditioners 9a to 9c, the cooling setpoint temperature for operation in the cooling mode to be a temperature that is obtained by subtracting $\iota$ degrees (I is a real number greater than or equal to 0) from minimum target temperature Tmin. Note that parameter $\iota$ may be a value previously stored in system controller 10, or may be changed from input and output terminal 19 by the user or the installer.

As a result, in the case where it is the cooling season, ventilating and air conditioning system 20 is controlled by operation of all air conditioners 9a to 9c so that the temperature of air conditioning room 18 will be lower than or equal to minimum target temperature Tmin of the individual target temperatures that are respectively set for habitable rooms 2a to 2d. Accordingly, ventilating and air conditioning system 20 can reliably bring habitable rooms 2a to 2d close to the individual target temperatures. Then, ventilating and air conditioning system 20 can perform this control to stably control the air in air conditioning room 18 without use of automatic operation of each of air conditioners 9a to 9c. Furthermore, in this case, all the plurality of air conditioners 9a to 9c disposed in air conditioning room 18 are set to the same operating mode and the same setpoint temperature. Therefore, even when one of the air conditioners 9a to 9c fails, air conditioning for air conditioning room 18 can be performed continuously. Therefore, ventilating and air conditioning system 20 can be provided that makes it possible to perform stable control.

On the other hand, as a result of the process of S71, when current outdoor temperature Tout is lower than or equal to the first threshold value (S71: No), system controller 10 executes the same process as the process of S24 in the mode determining process (see FIG. 4) executed by system controller 10 according to the first exemplary embodiment. This enables ventilating and air conditioning system 20 to stably control the air in air conditioning room 18 without use of automatic operation of each of air conditioners 9a to 9c. Therefore, ventilating and air conditioning system 20 can be provided that makes it possible to perform stable control.

As described above, ventilating and air conditioning system 20 according to the fourth exemplary embodiment sets the cooling mode for all of air conditioners 9a to 9c disposed in air conditioning room 18 and sets the cooling setpoint temperature to be a temperature lower than or equal to minimum target temperature Tmin, when it is determined to be the cooling season. Therefore, it is possible to control the temperatures of habitable rooms 2a to 2d stably.

Fifth Exemplary Embodiment

Next, ventilating and air conditioning system 20 according to a fifth exemplary embodiment, which is another embodiment of the air conditioning system of the present disclosure, will be described with reference to FIG. 10. This ventilating and air conditioning system 20 according to the fifth exemplary embodiment illustrates one exemplary embodiment of the operating modes and the setpoint temperatures for air conditioners 9a to 9c when it is determined to be the heating season.

In the following, ventilating and air conditioning system 20 according to the fifth exemplary embodiment is described, focusing primarily on the differences from ventilating and air conditioning system 20 according to the first exemplary embodiment. The same elements as those in ventilating and air conditioning system 20 according to the first exemplary embodiment are designated by the same reference characters, and description thereof will not be repeated.

Figure 10:
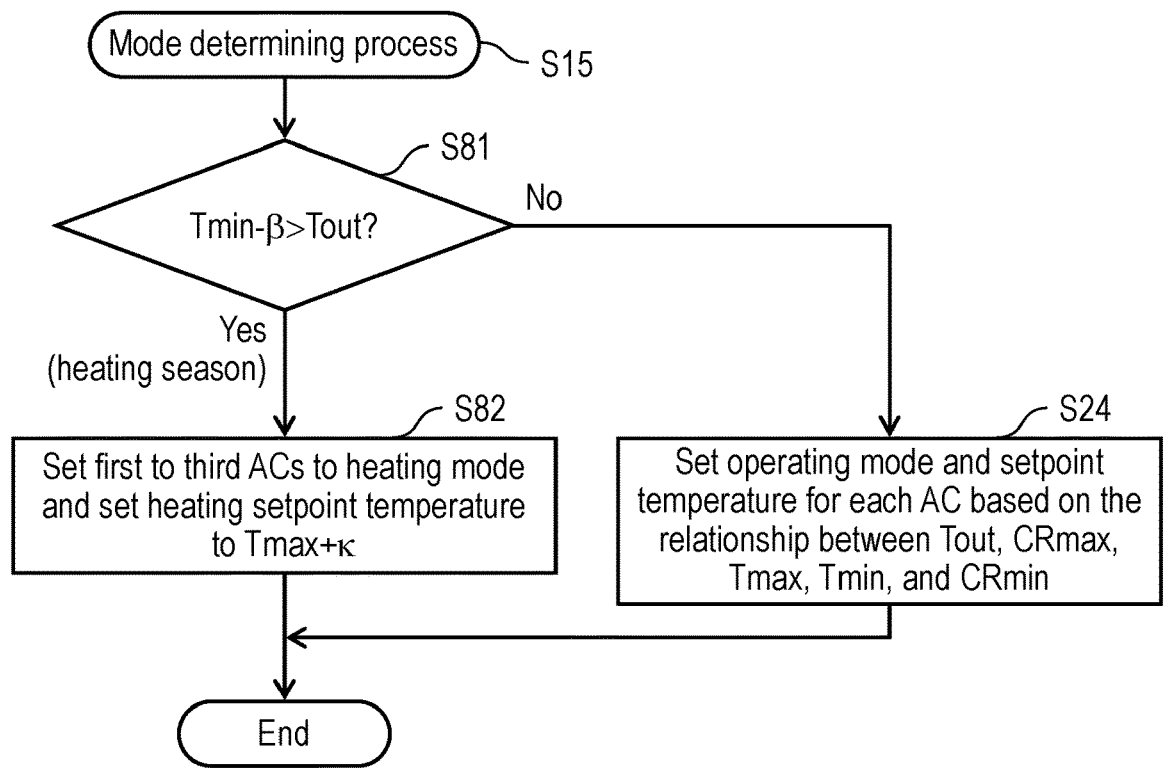
FIG. 10 is a flowchart illustrating a mode determining process executed by a system controller of a ventilating and air conditioning system according to a fifth exemplary embodiment of the disclosure.

FIG. 10 is a flowchart illustrating a mode determining process executed as the process of S15 in the mode setting process (see FIG. 3) by system controller 10 of ventilating and air conditioning system 20 according to the fifth exemplary embodiment.

When system controller 10 executes the mode determining process, it is first determined whether current outdoor temperature Tout is lower than the second threshold value Tmin−$\beta$, which is obtained by subtracting $\beta$ degrees ($\beta$ is a real number greater than or equal to 0) from minimum target temperature Tmin (S81). Parameter ß may be a value previously stored in system controller 10, or may be changed from input and output terminal 19 by the user or the installer.

In the process of S81, it is also possible to determine whether current outdoor temperature Tout is lower than or equal to second threshold value Tmin–ß, instead of determining whether current outdoor temperature Tout is lower than second threshold value Tmin–ß.

When current outdoor temperature Tout is lower than the second threshold value that is lower than or equal to minimum target temperature Tmin, it is considered to be the heating season, in which habitable rooms 2a to 2d should be heated. Accordingly, as a result of the process of S81, when it is determined that current outdoor temperature Tout is lower than the second threshold value (S81: Yes), system controller 10 determines that it is the heating season, and executes the processes of S82 to perform air conditioning that is suitable for the heating season for air conditioning room 18.

Specifically, in the process of S82, system controller 10 sets the operating mode for all of first AC 9a, second AC 9b, and third AC 9c to the heating mode. Also in the same process, system controller 10 sets, for these air conditioners 9a to 9c, the heating setpoint temperature for operation in the heating mode to be a temperature that is obtained by adding κ degrees (κ is a real number greater than or equal to 0) from maximum target temperature Tmax. Note that parameter κ may be a value previously stored in system controller 10, or may be changed from input and output terminal 19 by the user or the installer.

As a result, in the case where it is the heating season, ventilating and air conditioning system 20 is controlled by operation of all air conditioners 9a to 9c so that the temperature of air conditioning room 18 will be lower than or equal to maximum target temperature Tmax of the individual target temperatures that are respectively set for habitable rooms 2a to 2d. Accordingly, ventilating and air conditioning system 20 can reliably bring habitable rooms 2a to 2d close to the individual target temperatures. Then, ventilating and air conditioning system 20 can perform this control to stably control the air in air conditioning room 18 without use of automatic operation of each of air conditioners 9a to 9c. Furthermore, in this case, all the plurality of air conditioners 9a to 9c disposed in air conditioning room 18 are set to the same operating mode and the same setpoint temperature. Therefore, even when one of the air conditioners 9a to 9c fails, air conditioning for air conditioning room 18 can be performed continuously. Therefore, ventilating and air conditioning system 20 can be provided that makes it possible to perform stable control.

On the other hand, as a result of the process of S81, when current outdoor temperature Tout is higher than or equal to the second threshold value (S81: No), system controller 10 executes the same process as the process of S24 in the mode determining process (see FIG. 4) executed by system controller 10 according to the first exemplary embodiment. This enables ventilating and air conditioning system 20 to stably control the air in air conditioning room 18 without use of automatic operation of each of air conditioners 9a to 9c. Therefore, ventilating and air conditioning system 20 can be provided that makes it possible to perform stable control.

As described above, ventilating and air conditioning system 20 according to the fifth exemplary embodiment sets the heating mode for all of air conditioners 9a to 9c disposed in air conditioning room 18 and sets the heating setpoint temperature to be a temperature lower than or equal to maximum target temperature Tmax, when it is determined to be the heating season. Therefore, it is possible to control the temperatures of habitable rooms 2a to 2d stably.

Sixth Exemplary Embodiment

Next, ventilating and air conditioning system 20 according to a sixth exemplary embodiment, which is another embodiment of the air conditioning system of the present disclosure, will be described with reference to FIG. 11. This ventilating and air conditioning system 20 according to the sixth exemplary embodiment illustrates one embodiment of the operating modes and setpoint temperatures for air conditioners 9a to 9c.

Normally, air conditioners 9a to 9c have a dehumidifying function when operated in the cooling mode. In summer, for example, air conditioners 9a to 9c operate in the cooling mode. As a result, the air conditioning room is dehumidified and kept to an appropriate humidity. However, from around May to around June in Japan, which corresponds to an intermediate season, the temperature is about 20 degrees to 26 degrees, but the humidity rises to about 75% because it is a rainy season. That is, although the temperature is in a comfortable range, the humidity makes a person feel uncomfortable.

In view of the problem, a dehumidifying process using a plurality of air conditioners 9a to 9c is described in the present exemplary embodiment.

The configuration of the present exemplary embodiment is similar to that of the first exemplary embodiment, but airflow volume determiner 31 further includes an air conditioning room humidity sensor 15 connected thereto so that airflow volume determiner 31 can acquire the humidity of the air conditioning room. In other words, in addition to the structure shown in FIG. 2, air conditioning room humidity sensor 15 is connected to airflow volume determiner 31.

Hereinbelow, the processes performed by airflow volume determiner 31 and mode setter 32 according to the above-mentioned configuration will be described. System controller 10 constitutes mode setter 32 by executing the mode determining process shown in FIG. 11.

Figure 11:
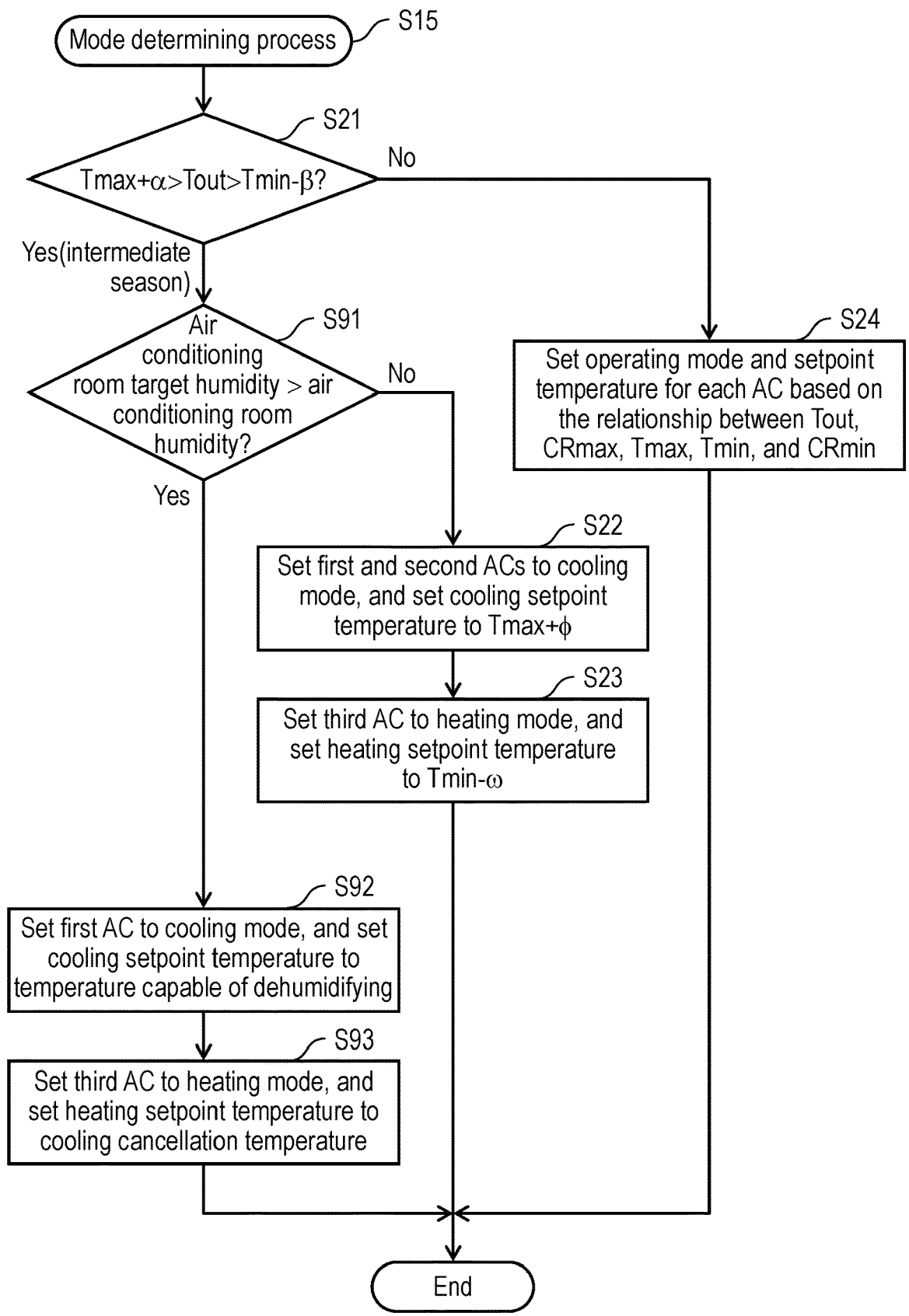
FIG. 11 is a flowchart illustrating a mode determining process executed by a system controller of a ventilating and air conditioning system according to a sixth exemplary embodiment of the disclosure.

When system controller 10 executes the mode determining process shown in FIG. 11, it is first determined by the process of S21 in the mode determining process (see FIG. 4) whether it is an intermediate season (S21). As a result, when it is determined to be an intermediate season (S21: Yes), system controller 10 subsequently determines whether or not the humidity of the air in air conditioning room 18 is higher than a predetermined target humidity (air conditioning room target humidity) (S91). Note that the air conditioning room target humidity is a humidity that is input from input and output terminal 19, that is, the target humidity input receiver.

Here, system controller 10 causes the air in air conditioning room 18 to be dehumidified so that the humidity becomes the air conditioning room target humidity when the humidity of the air in air conditioning room 18 is higher than the air conditioning room target humidity (S91: Yes).

The dehumidifying in air conditioning room 18 according to the present exemplary embodiment is performed as follows. That is, the mode setter that makes up system controller 10 sets first AC to the cooling mode and further sets the cooling setpoint temperature in the cooling mode to be a temperature such that air conditioning room 18 can be dehumidified (S92). More specifically, system controller 10 calculates the dew-point temperature of the air conditioning room based on the temperature of the air conditioning room acquired from air conditioning room temperature sensor 14 and the humidity of the air conditioning room acquired from air conditioning room humidity sensor 15. Then, the cooling setpoint temperature for first AC is set to be less than or equal to the calculated dew-point temperature. Also, the cooling setpoint temperature is changed based on the degree of deviation between the humidity of the air in air conditioning room 18 and the air conditioning room target humidity. More specifically, when the deviation is greater, the cooling setpoint temperature should be accordingly lowered, in other words, the difference between the cooling setpoint temperature and the dew-point temperature should be made greater.

The mode setter that makes up system controller 10 sets third AC to the heating mode, and further sets the heating setpoint temperature in the heating mode to be a temperature such as to cancel the cooling of the air conditioning room 18 performed by first AC (S93). Here, the temperature such as to cancel the cooling may also be called, in other words, a temperature such that the temperature before the dehumidifying process can be maintained. Specifically, for example, it is assumed that the temperature of air conditioning room 18 is 22 degrees, and the cooling setpoint temperature is 18 degrees. In this case, the temperature difference is 4 degrees, so the heating setpoint temperature should be set to be 26 degrees, in which 4 degrees is added to the temperature of air conditioning room 18, 22 degrees. Thereby, the cooling performed by first AC can be cancelled by the heating performed by third AC.

However, this cancellation may be different depending on the area and the heat insulation condition of air conditioning room 18, and the outdoor air supply volume. For that reason, the mode setter that makes up system controller 10 may store the temperature prior to performing the dehumidifying process and dynamically change the heating setpoint temperature for third AC so that the temperature can be maintained.

The above-described process enables efficient dehumidifying when the humidity is high even when the temperature control of habitable rooms is unnecessary in the intermediate season, so it is possible to provide both a natural temperature environment that corresponds to the season and a more comfortable humidity environment.

Moreover, the present exemplary embodiment eliminates the need for pipes required for operating a dehumidifier, and furthermore, makes it possible to provide ventilating and air conditioning system 20 with even higher dehumidifying capabilities.

In the present exemplary embodiment, determination for an intermediate season is carried out, and an example of embodiment in the intermediate season has been described. However, the judgement of intermediate season according to the description of the first exemplary embodiment is not necessary, and it is possible to carry out the above-described dehumidifying process with the judgement for temperature and humidity only, without carrying out the judgement for the intermediate season.

In addition, humidity is difficult to stabilize to a constant value. For this reason, the air conditioning room target humidity that is input through input and output terminal 19 may be set with a predetermined humidity range. Specifically, the air conditioning room target humidity may be set in a range of 45% to 55%. In this case, when the air conditioning room target humidity falls within the range, the dehumidifying process is not performed, and when the air conditioning room target humidity exceeds the upper limit value, 55%, the dehumidifying process is performed with the air conditioning room target humidity being set to the average value (50%) in this range. This makes humidity control, which is a difficult control operation, easier, and serves to avoid frequent on/off switching of a plurality of air conditioners 9a to 9c.

Although exemplary embodiments of the present disclosure have been described hereinabove, it will be readily appreciated that the present disclosure is not limited to the foregoing exemplary embodiments in any way, and various improvements and modifications may be made without departing from the principles of the present disclosure. For example, each of the exemplary embodiments may be modified by adding a part or a plurality of parts of another exemplary embodiment thereto, or by replacing a part or a plurality of parts with those of another exemplary embodiment. Moreover, the numerical values presented in the embodiments are merely exemplary, and it is of course possible to employ other numerical values.

The foregoing exemplary embodiments have described a case in which system controller 10 is provided independently from outdoor air intake fan 4 and exhaust fans 5a to 5d so that system controller 10 serves as a hub and communication is conducted between system controller 10 and outdoor air intake fan 4 and between system controller 10 and exhaust fans 5a to 5d. On the other hand, it is also possible that outdoor air intake fan 4 and exhaust fans 5a to 5d may perform communication with each other directly, and controlling may be performed in association with each other. When this is the case, system controller 10 may be incorporated in outdoor air intake fan 4.

Circulating fans 6a to 6d and conveying fans 3a to 3d are in communication with each other by ducts that connect habitable rooms 2a to 2d to air conditioning room 18. However, it is not necessary to connect circulating fans 6a to 6d with a duct, and it is also possible to consider a space such as a corridor connecting habitable rooms 2a to 2d as a duct. In this case, the air inside each of habitable rooms 2a to 2d is transferred from habitable rooms 2a to 2d to the corridor by a circulating fan. The air transferred to the corridor is taken into air conditioning room 18 that is in communication with the corridor. Taking the air into air conditioning room 18 may be performed by providing an intake fan on a wall surface of the air conditioning room that faces the corridor. Alternatively, it is possible to take the air into air conditioning room 18 by causing a negative pressure in air conditioning room 18 without use of a circulating fan and/or an intake fan. Although such a configuration is expected to lower the circulation efficiency compared to the duct connection structure, it can contribute to making the humidity uniform.

INDUSTRIAL APPLICABILITY

Embodiments of the ventilating and air conditioning system according to the disclosure are applicable to separate residential houses and multi-unit residential houses such as condominiums. When it is applied to a multi-unit residential house, a single system should correspond to a household unit, and each household should not be regarded as one habitable room.

REFERENCE MARKS IN THE DRAWINGS 1 general residential house
2a habitable room
2b habitable room
2c habitable room
2d habitable room
3a conveying fan 3b conveying fan
3c conveying fan
3d conveying fan
4 outdoor air intake fan
5a exhaust fan
5b exhaust fan
5c exhaust fan
5d exhaust fan
6a circulating fan
6b circulating fan
6c circulating fan
6d circulating fan
7 outdoor temperature sensor
9a first air conditioner (first AC)
9b second air conditioner (second AC)
9c third air conditioner (third AC)
10 system controller
11a habitable room temperature sensor
11b habitable room temperature sensor
11c habitable room temperature sensor
11d habitable room temperature sensor
12a habitable room humidity sensor
12b habitable room humidity sensor
12c habitable room humidity sensor
12d habitable room humidity sensor
14 air conditioning room temperature sensor
15 air conditioning room humidity sensor
16 humidifier
17 dehumidifier
18 air conditioning room
19 input and output terminal
20 ventilating and air conditioning system
31 airflow volume determiner
32 mode setter
33 fan airflow volume controller

The invention claimed is:

1. An air conditioning system comprising:
a plurality of air conditioners disposed in an air conditioning room and each being independently controllable;
a plurality of conveying fans transferring air of the air conditioning room to a plurality of habitable rooms each being different from the air conditioning room, the conveying fans disposed respectively corresponding to the plurality of habitable rooms;
a habitable room temperature sensor acquiring temperatures of each of the plurality of habitable rooms;
an outdoor temperature sensor acquiring an outdoor temperature;
an air conditioning room temperature sensor acquiring a temperature of the air conditioning room;
a target temperature input receiver receiving input of individual target temperatures each being a target temperature of each of the plurality of habitable rooms; and
a system controller controlling the air conditioners and the conveying fans, wherein
the system controller includes:
an airflow volume determiner determining an airflow volume of each of the conveying fans, based on the individual target temperatures acquired from the target temperature input receiver, the temperatures of the plurality of habitable rooms acquired by the habitable room temperature sensor, and the temperature of the air conditioning room acquired by the air conditioning room temperature sensor;
a mode setter setting a cooling mode and a cooling setpoint temperature for operation in the cooling mode, or a heating mode and a heating setpoint temperature for operation in the heating mode, for each of the plurality of air conditioners, based on the individual target temperatures acquired from the target temperature input receiver and the outdoor temperature acquired by the outdoor temperature sensor; and
a fan airflow volume controller causing the air in the air conditioning room that is air-conditioned based on settings set by the mode setter to be independently transferred to the habitable rooms at the airflow volumes of the conveying fans that are determined by the airflow volume determiner.

2. The air conditioning system according to claim 1, wherein
the mode setter defines a minimum target temperature to be a lowest one of the plurality of individual target temperatures and a maximum target temperature to be a highest one of the plurality of individual target temperatures, and
when the outdoor temperature is lower than a first threshold value and higher than a second threshold value, the first threshold value being set to be higher than or equal to the maximum target temperature and the second threshold value being set to be lower than or equal to the minimum target temperature, the mode setter determines that it is an intermediate season and sets at least one of the plurality of air conditioners to the heating mode and at least another one to the cooling mode.

3. The air conditioning system according to claim 2, wherein, when the mode setter determines that it is the intermediate season, the mode setter sets a setpoint temperature for the at least one of the air conditioners that is set to the heating mode to be lower than or equal to the minimum target temperature, and a setpoint temperature for the at least other one of the air conditioners that is set to the cooling mode to be higher than or equal to the maximum target temperature.

4. The air conditioning system according to claim 2, wherein, when the mode setter determines that it is the intermediate season, the mode setter sets a setpoint temperature for the at least one of the air conditioners that is set to the heating mode to be a temperature higher than the minimum target temperature and lower than or equal to an average value of the plurality of individual target temperatures, and sets a setpoint temperature for the other one of the air conditioners that is set to the cooling mode to be a temperature lower than the maximum target temperature and greater than or equal to the average value.

5. The air conditioning system according to claim 4, wherein, when the mode setter determines that it is the intermediate season, the mode setter sets both the setpoint temperature for the one of the air conditioners that is set to the heating mode and the setpoint temperature for the other one of the air conditioners that is set to the cooling mode to be the average value.

6. The air conditioning system according to claim 2, wherein, when the mode setter determines that it is the intermediate season, the mode setter calculates, for each of the habitable rooms, absolute values of differences between the temperatures acquired by the habitable room temperature sensor and the target temperatures of the habitable rooms, and sets the setpoint temperatures for the air conditioners to be a temperature such as to be able to cause the temperature of one of the habitable rooms with a greatest one of the absolute values to reach the target temperature of the habitable room.

7. The air conditioning system according to claim 6, wherein, when the target temperature of the one of the habitable rooms with the greatest one of the absolute values is higher than the temperature of the air conditioning room, the mode setter sets the setpoint temperature for the at least one of the air conditioners that is set to the heating mode to be higher than or equal to the target temperature, and when the target temperature of the one of the habitable rooms with the greatest one of the absolute values is lower than the temperature of the air conditioning room, the mode setter sets the setpoint temperature for the at least other one of the air conditioners that is set to the cooling mode to be lower than or equal to the target temperature.

8. The air conditioning system according to claim 2, wherein the mode setter performs determination of the intermediate season within a range of 4 hours before and after a culmination time of the sun.

9. The air conditioning system according to claim 2, further comprising:
an outdoor air intake fan introducing outdoor air into the air conditioning room, wherein
when the mode setter determines that it is the intermediate season and the outdoor temperature is within a range from the minimum target temperature to the maximum target temperature, the mode setter increases an outdoor air supply volume supplied to the air conditioning room by the outdoor air intake fan to be greater than when the outdoor temperature is higher than the maximum target temperature and lower than the minimum target temperature.

10. The air conditioning system according to claim 1, wherein the mode setter defines a maximum target temperature to be a highest one of the plurality of individual target temperatures, and when the outdoor temperature is lower than a first threshold value that is set to be higher than or equal to the maximum target temperature, the mode setter determines that it is the cooling season and sets at least two of the plurality of air conditioners to the cooling mode.

11. The air conditioning system according to claim 10, wherein the mode setter sets the cooling mode and sets the cooling setpoint temperature for operation in the cooling mode to be lower than or equal to a minimum target temperature that is a lowest one of the plurality of individual target temperatures.

12. The air conditioning system according to claim 1, wherein the mode setter defines a minimum target temperature to be a lowest one of the plurality of individual target temperatures, and when the outdoor temperature is lower than a second threshold value that is set to be lower than or equal to the minimum target temperature, the mode setter determines that it is the heating season and sets at least two of the plurality of air conditioners to the heating mode.

13. The air conditioning system according to claim 12, wherein the mode setter sets the heating mode and sets the heating setpoint temperature for operation in the heating mode to be higher than or equal to a maximum target temperature that is a highest one of the plurality of individual target temperatures.

14. The air conditioning system according to claim 1, wherein, after the mode setter sets the cooling mode or the heating mode for the air conditioners, the mode setter does not change the set operating mode for a predetermined time.

15. The air conditioning system according to claim 1, further comprising:
an air conditioning room humidity sensor acquiring a humidity of the air conditioning room; and
a target humidity input receiver receiving input of a target humidity of each of the plurality of habitable rooms, wherein
the system controller sets, when it is determined to be an intermediate season and the humidity of the air conditioning room acquired by the air conditioning room humidity sensor is higher than the target humidity acquired from the target humidity input receiver, a cooling mode and a cooling setpoint temperature for operation in the cooling mode for at least one of the plurality of air conditioners, the cooling setpoint temperature being a temperature such that the air of the air conditioning room can be dehumidified, based on the temperature of the air conditioning room acquired by the air conditioning room temperature sensor and the humidity of the air conditioning room acquired by the air conditioning room humidity sensor, and sets a heating mode and a heating setpoint temperature for operation in the heating mode for at least another one of the air conditioners that is other than the at least one of the air conditioners that is set to the cooling mode.

16. An air conditioning system comprising:
a plurality of air conditioners disposed in an air conditioning room and each being independently controllable;
a conveying fan transferring air of the air conditioning room to a plurality of habitable rooms each being different from the air conditioning room;
an air conditioning room temperature sensor acquiring a temperature of the air conditioning room;
an air conditioning room humidity sensor acquiring a humidity of the air conditioning room;
a target humidity input receiver receiving input of a target humidity of each of the plurality of habitable rooms; and
a system controller controlling the air conditioners, wherein
the system controller includes a mode setter that sets, when the humidity of the air conditioning room acquired by the air conditioning room humidity sensor is higher than the target humidity acquired from the target humidity input receiver, a cooling mode and a cooling setpoint temperature for operation in the cooling mode for at least one of the plurality of air conditioners, the cooling setpoint temperature being a temperature such that the air of the air conditioning room can be dehumidified, based on the temperature of the air conditioning room acquired by the air conditioning room temperature sensor and the humidity of the air conditioning room acquired by the air conditioning room humidity sensor, and sets a heating mode and a heating setpoint temperature for operation in the heating mode for at least another one of the air conditioners that is other than the at least one of the air conditioners that is set to the cooling mode.

17. The air conditioning system according to claim 16, further comprising:
a target temperature input receiver receiving input of a target temperature of the habitable rooms, and
an air conditioning room temperature sensor acquiring a temperature of the air conditioning room, wherein
the system controller sets the heating setpoint temperature such as to maintain the temperature of the air conditioning room to the target temperature of the habitable rooms by heating performed by the at least one air conditioner that is set to the heating mode, against cooling performed by the at least one air conditioner that is set to the cooling mode.

18. The air conditioning system according to claim 16, wherein the system controller sets the cooling setpoint temperature for the at least one air conditioner operating in the cooling mode based on a degree of deviation between the target humidity and the humidity of the air conditioning room.

19. The air conditioning system according to claim 16, wherein the target humidity input receiver receives the target humidity with a predetermined humidity range.

* * * * *